(12) United States Patent
Wood et al.

(10) Patent No.: US 6,306,936 B1
(45) Date of Patent: Oct. 23, 2001

(54) RIGID POLYMERIC BEVERAGE BOTTLES WITH IMPROVED RESISTANCE TO PERMEANT ELUTION

(75) Inventors: Willard E. Wood, Arden Hills; Neil J. Beaverson, Hugo, both of MN (US)

(73) Assignee: Cellresin Technologies, LLC, Minneapolis, MN (US)

( * ) Notice: Subject to any disclaimer, the term of this patent is extended or adjusted under 35 U.S.C. 154(b) by 0 days.

(21) Appl. No.: 09/549,481

(22) Filed: Apr. 14, 2000

Related U.S. Application Data

(62) Division of application No. 09/189,217, filed on Nov. 10, 1998, now Pat. No. 6,136,354, which is a division of application No. 08/931,324, filed on Sep. 16, 1997, now Pat. No. 5,837,339, which is a continuation-in-part of application No. 08/264,771, filed on Jun. 23, 1994, now Pat. No. 5,492,947.

(51) Int. Cl.$^7$ .................................. C08L 3/04; C08L 5/16

(52) U.S. Cl. ............................................................... 524/48

(58) Field of Search ................................................ 524/48

(56) References Cited

U.S. PATENT DOCUMENTS

| | | |
|---|---|---|
| 655,661 | 8/1900 | Reenstierna . |
| 2,389,168 | 11/1945 | Snyder . |
| 2,412,148 | 12/1946 | Hershberger . |
| 2,715,085 | 8/1955 | Boger . |
| 2,802,763 | 8/1957 | Freedlander . |
| 2,860,801 | 11/1958 | Nielsen . |
| 2,973,293 | 2/1961 | Schofield . |
| 3,129,014 | 4/1964 | Hutchison et al. . |
| 3,472,835 | 10/1969 | Buckler et al. . |
| 3,526,572 | 9/1970 | Finelli . |
| 3,536,260 | 10/1970 | Volz . |
| 3,616,010 | 10/1971 | Dunholter et al. . |
| 3,616,189 | 10/1971 | Harr . |
| 3,687,087 | 8/1972 | Yurkoski et al. . |
| 3,733,309 | 5/1973 | Wyeth et al. . |
| 3,740,258 | 6/1973 | Walles . |
| 3,802,984 | 4/1974 | Brugh, Jr. et al. . |
| 3,886,017 | 5/1975 | Brugh, Jr. et al. . |
| 3,904,104 | 9/1975 | Kane . |
| 3,958,056 | 5/1976 | Brugh, Jr. et al. . |

(List continued on next page.)

FOREIGN PATENT DOCUMENTS

| | | |
|---|---|---|
| 2927733 | 1/1980 | (DE) . |
| 3710569 | 5/1988 | (DE) . |
| 195 20 989 A | 12/1996 | (DE) . |
| 0 454910 | 11/1991 | (EP) . |
| 483380A1 | 5/1992 | (EP) . |
| 0 600 775 | 1/1994 | (EP) . |
| 0 626 256 | 11/1994 | (EP) . |
| 1441752 | 6/1977 | (FR) . |
| 2677366 | 6/1991 | (FR) . |
| 91-6849 | 6/1991 | (FR) . |
| 75-64144 | 5/1975 | (JP) . |
| 54-142282 | 11/1979 | (JP) . |
| 57-205515 | 12/1982 | (JP) . |
| 84-156531 | 7/1984 | (JP) . |
| 84-260004 | 12/1984 | (JP) . |
| 61-103542 | 5/1986 | (JP) . |
| 86-106348 | 5/1986 | (JP) . |
| 87-27162 | 2/1987 | (JP) . |
| 87-98608 | 4/1987 | (JP) . |
| 87-269030 | 10/1987 | (JP) . |

(List continued on next page.)

OTHER PUBLICATIONS

"Determination of Poly(ethylene terephthalate) Oligomers in Refrigeration Oils by Adsorption Column Chromatography-Gel Permeation Chromatography", Kshiono, *Anal. Chem.*, vol. 51, pp. 2398–2400 (Dec. 1979).

"Injection Blow–Molding and Stretch–Blow Molding", *Modern Plastics Encyclopedia*, vol. 61, No. 10A (1984) pp. 192–194.

"Integrated Forms of Simple Rate Expressions," pp. 17–19.

"Odors and taints from paperboard food packaging", Tice et al., *Tappi Journal*, vol. 77, No. 12, pp. 149–154.

"Points to consider for the Use of Recycled Plastics in Food Packaging: Chemistry Considerations," Chemistry Review Branch, U.S. Food & Drug Administration, Washington, D.C., pp. 1–9, May, 1992.

"Separation and Identification of Poly(ethylene Terephthalate) Oligomers by Gel Permeation Chromatography", *Journal of Polymer Science: Polymer Chemistry Edition*, vol. 17, pp. 4123–4127 (1979).

"Supercritical Fluid Extraction and Chromatography for the Determination of Oligomers in Poly(ethylene terephthalate) Films", Bartle et al., *Anal. Chem.*, vol. 63, pp. 2371–2377 (1991).

(List continued on next page.)

*Primary Examiner*—Peter Szekely
(74) *Attorney, Agent, or Firm*—Merchant & Gould P.C.

(57) ABSTRACT

Carbonated beverages can have a substantially reduced concentration of water soluble materials derived from biaxially oriented thermoformed beverage containers. Such containers can comprise a permeant barrier and an active trap for water soluble materials that can be removed from the thermoplastic by extraction into the carbonated beverage. The improved container material comprises a blow molded thermoplastic polyester web comprising a compatible modified cyclodextrin material having pendent moieties or substituents that render the cyclodextrin material compatible with the container thermoplastic. The cyclodextrin material, after it is added to the polymer material, acts as a barrier and to trap extractable materials as they permeate through the thermoplastic polyester. The cyclodextrin molecule has a large center cavity having properties that increase the likelihood that organic molecules will be absorbed and trapped in the center pore. The resulting polyester is substantially resistant to any extraction of soluble materials from the polyester material by the carbonated beverage.

9 Claims, 2 Drawing Sheets

U.S. PATENT DOCUMENTS

Figure 2:
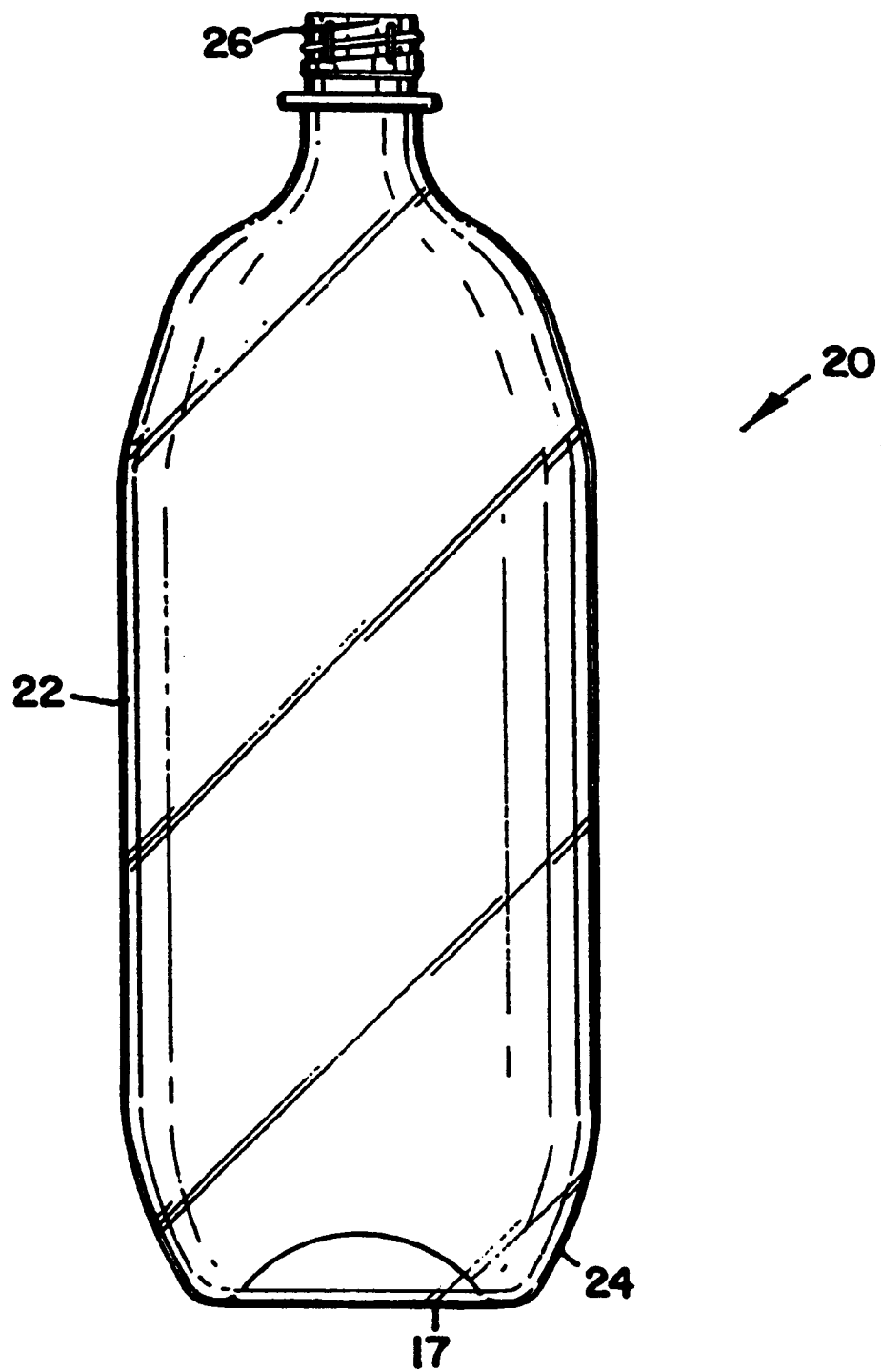

| | | |
|---|---|---|
| 3,972,467 | 8/1976 | Whillock et al. . |
| 4,048,361 | 9/1977 | Valyi . |
| 4,108,324 | 8/1978 | Krishnakumar et al. . |
| 4,127,633 | 11/1978 | Addleman . |
| 4,131,141 | 12/1978 | Weissenbach . |
| 4,223,128 | 9/1980 | Halek et al. . |
| 4,258,082 | 3/1981 | Horne . |
| 4,274,985 | 6/1981 | Szejtli et al. . |
| 4,303,755 | 12/1981 | Yukuta et al. . |
| 4,318,489 | 3/1982 | Snyder et al. . |
| 4,334,627 | 6/1982 | Krishnakumar et al. . |
| 4,342,398 | 8/1982 | Chang . |
| 4,356,115 | 10/1982 | Shibanai et al. . |
| 4,357,468 | 11/1982 | Szejtli et al. . |
| 4,368,825 | 1/1983 | Motill . |
| 4,370,368 | 1/1983 | Hirata et al. . |
| 4,371,574 | 2/1983 | Shefford . |
| 4,374,878 | 2/1983 | Jakobsen et al. . |
| 4,376,089 | 3/1983 | Bogner et al. . |
| 4,381,277 | 4/1983 | Nilsson . |
| 4,385,089 | 5/1983 | Bonnebat et al. . |
| 4,393,106 | 7/1983 | Maruhashi et al. . |
| 4,434,021 | 2/1984 | Robinson et al. . |
| 4,459,400 | 7/1984 | Kuhfuss et al. . |
| 4,463,121 | 7/1984 | Gartland et al. . |
| 4,473,515 | 9/1984 | Ryder . |
| 4,482,586 | 11/1984 | Smith et al. . |
| 4,486,378 | 12/1984 | Hirata et al. . |
| 4,525,396 | 6/1985 | Takasa et al. . |
| 4,547,572 | 10/1985 | Fenyvesi et al. . |
| 4,568,574 | 2/1986 | Allen . |
| 4,598,741 | 7/1986 | Johnson et al. . |
| 4,615,914 | 10/1986 | Walles . |
| 4,636,343 | 1/1987 | Shibanai . |
| 4,677,177 | 6/1987 | Shibanai et al. . |
| 4,681,934 | 7/1987 | Shibanai et al. . |
| 4,698,246 | 10/1987 | Gibbons et al. . |
| 4,711,936 | 12/1987 | Shibanai et al. . |
| 4,719,135 | 1/1988 | Gerdes et al. . |
| 4,722,815 | 2/1988 | Shibanai . |
| 4,725,633 | 2/1988 | Shibanai . |
| 4,725,657 | 2/1988 | Shibanai . |
| 4,726,905 | 2/1988 | Friedman et al. . |
| 4,727,064 | 2/1988 | Pitha . |
| 4,728,510 | 3/1988 | Shibanai et al. . |
| 4,732,759 | 3/1988 | Shibanai et al. . |
| 4,738,923 | 4/1988 | Ammeraal . |
| 4,769,242 | 9/1988 | Shibanai . |
| 4,772,291 | 9/1988 | Shibanai et al. . |
| 4,774,329 | 9/1988 | Friedman . |
| 4,780,257 | 10/1988 | Beck . |
| 4,781,977 | 11/1988 | Yagi et al. . |
| 4,795,665 | 1/1989 | Lancaster et al. . |
| 4,808,232 | 2/1989 | Beesley . |
| 4,840,679 | 6/1989 | Ammeraal et al. . |
| 4,847,151 | 7/1989 | Shibanai . |
| 4,850,494 | 7/1989 | Howard, Jr. . |
| 4,851,394 | 7/1989 | Kubodera . |
| 4,871,541 | 10/1989 | Shibanai . |
| 4,877,774 | 10/1989 | Pitha et al. . |
| 4,877,778 | 10/1989 | Carpenter et al. . |
| 4,894,267 | 1/1990 | Bettle et al. . |
| 4,902,788 | 2/1990 | Zemel et al. . |
| 4,904,306 | 2/1990 | Ammeraal . |
| 4,904,307 | 2/1990 | Ammeraal . |
| 4,906,488 | 3/1990 | Pera . |
| 4,915,301 | 4/1990 | Munteanu . |
| 4,917,956 | 4/1990 | Rohrbach . |
| 4,920,214 | 4/1990 | Friedman . |
| 4,925,684 | 5/1990 | Simon . |
| 4,931,524 | 6/1990 | Sato et al. . |
| 4,938,998 | 7/1990 | Stock . |
| 4,956,210 | 9/1990 | Hoyt et al. . |
| 4,965,104 | 10/1990 | Barton et al. . |
| 4,977,004 | 12/1990 | Bettle, III et al. . |
| 4,977,936 | 12/1990 | Thompson et al. . |
| 5,001,176 | 3/1991 | Nakazima . |
| 5,006,377 | 4/1991 | Delcorps et al. . |
| 5,007,966 | 4/1991 | Hedges et al. . |
| 5,007,967 | 4/1991 | Ammeraal . |
| 5,032,182 | 7/1991 | Ammeraal et al. . |
| 5,041,227 | 8/1991 | van Eikeren et al. . |
| 5,063,251 | 11/1991 | Bergishagen . |
| 5,079,088 | 1/1992 | McGroarty et al. . |
| 5,080,795 | 1/1992 | Pirkle et al. . |
| 5,096,893 | 3/1992 | Pitha et al. . |
| 5,098,793 | 3/1992 | Rohrbach et al. . |
| 5,100,878 | 3/1992 | Geber . |
| 5,102,699 | 4/1992 | Beeson et al. . |
| 5,120,720 | 6/1992 | Pitha et al. . |
| 5,122,399 | 6/1992 | Farrell et al. . |
| 5,129,544 | 7/1992 | Jacobson et al. . |
| 5,139,687 | 8/1992 | Brogher et al. . |
| 5,142,035 | 8/1992 | Lewis . |
| 5,147,480 | 9/1992 | Lang . |
| 5,153,061 | 10/1992 | Cavagna et al. . |
| 5,173,481 | 12/1992 | Pitha et al. . |
| 5,177,129 | 1/1993 | Bobo, Jr. . |
| 5,178,946 | 1/1993 | Sato et al. . |
| 5,180,190 | 1/1993 | Kersey et al. . |
| 5,183,706 | 2/1993 | Bekele . |
| 5,183,809 | 2/1993 | Weisz et al. . |
| 5,198,429 | 3/1993 | Konig et al. . |
| 5,202,188 | 4/1993 | Bekele . |
| 5,208,083 | 5/1993 | Freed . |
| 5,208,316 | 5/1993 | Yoshinaga . |
| 5,213,808 | 5/1993 | Bar-Shalom et al. . |
| 5,221,669 | 6/1993 | Anand et al. . |
| 5,223,311 | 6/1993 | Tsutsumi et al. . |
| 5,223,346 | 6/1993 | Lu . |
| 5,230,935 | 7/1993 | Delimoy et al. . |
| 5,232,767 | 8/1993 | Hisazumi et al. . |
| 5,241,059 | 8/1993 | Yoshinaga . |
| 5,242,701 | 9/1993 | Poole . |
| 5,244,615 | 9/1993 | Hobbs . |
| 5,246,611 | 9/1993 | Trinh . |
| 5,247,013 | 9/1993 | Shinoda et al. . |
| 5,252,384 | 10/1993 | Bothe et al. . |
| 5,254,258 | 10/1993 | Pirkle et al. . |
| 5,254,394 | 10/1993 | Bothe et al. . |
| 5,256,491 | 10/1993 | Ishida et al. . |
| 5,258,414 | 10/1993 | Bergishagen . |
| 5,262,444 | 11/1993 | Rusincovitch et al. . |
| 5,266,387 | 11/1993 | Fujii et al. . |
| 5,266,413 | 11/1993 | Mills et al. . |
| 5,269,935 | 12/1993 | Clough et al. . |
| 5,314,733 | 5/1994 | Saito et al. . |
| 5,324,383 | 6/1994 | Lang . |
| 5,330,565 | 7/1994 | Saitoh et al. . |
| 5,330,808 | 7/1994 | Duff et al. . |
| 5,335,373 | 8/1994 | Kangman . |
| 5,336,762 | 8/1994 | Ranney . |
| 5,350,788 | 9/1994 | Visioli et al. . |
| 5,352,717 | 10/1994 | Bergishagen . |
| 5,354,424 | 10/1994 | Rha et al. . |
| 5,378,414 | 1/1995 | Derkach . |
| 5,378,421 | 1/1995 | Salame . |
| 5,384,172 | 1/1995 | Takado et al. . |
| 5,398,729 | 3/1995 | Spurgat . |
| 5,405,567 | 4/1995 | Needham et al. . |
| 5,505,969 | 4/1996 | Wood et al. . |

| | | |
|---|---|---|
| 5,837,339 | 11/1998 | Wood et al. . |

FOREIGN PATENT DOCUMENTS

| | | |
|---|---|---|
| 62-263047 | 11/1987 | (JP) . |
| 88-87925 | 4/1988 | (JP) . |
| 63-218063 | 9/1988 | (JP) . |
| 63-237932 | 10/1988 | (JP) . |
| 63-265926 | 11/1988 | (JP) . |
| 89-16618 | 1/1989 | (JP) . |
| 89-167496 | 6/1989 | (JP) . |
| 90-18702 | 1/1990 | (JP) . |
| 90-18703 | 1/1990 | (JP) . |
| 90-18704 | 1/1990 | (JP) . |
| 90-18705 | 1/1990 | (JP) . |
| 90-18706 | 1/1990 | (JP) . |
| 90-254844 | 9/1990 | (JP) . |
| 3-100065 | 4/1991 | (JP) . |
| 91-133163 | 6/1991 | (JP) . |
| 4-108523 | 4/1992 | (JP) . |
| 4-132556 | 5/1992 | (JP) . |
| 92-362141 | 12/1992 | (JP) . |
| 6-181728 | 7/1994 | (JP) . |
| 7-35168 | 4/1995 | (JP) . |
| 91-JP667 | 5/1991 | (WO) . |
| 91-JP1012 | 7/1991 | (WO) . |
| 0014888 | 7/1994 | (WO) . |
| 95 12484 | 5/1995 | (WO) . |
| WO 96 00260 A | 1/1996 | (WO) . |

OTHER PUBLICATIONS

Patent Abstracts of Japan, vol. 15, No. 493 (M–1191), Dec. 13, 1991 & JP 03 215031 A (Kyoraku Co. Ltd.), Sep. 20, 1991. (See Abstract) & Database WPI Week 9144, Derwent Publications Ltd., London, GB (See Abstract).
Database WPI, Section CH, Week 8842, Derwent Publications Ltd., London, GB; XP002033905 & JP 63 218 063A (Chikayku Shoten KK), Sep. 12, 1998.
Database WPI, Section CH, Week 9123, Derwent Publications Ltd., London, GB; Class A18, AN 91–167598 XP002033643 & JP 03 100 065 A (Toppan Printing Co. Ltd.), Apr. 25, 1991.
"Formation of ultrathin films consisting of proteins or polysaccharides and syndiotactic–rich poly(vinyl alcohol) mixtures adsorbed at air–solution interface," K. Yamaura et al., *Colloid Polym. Sci.*, 268(10), 96871. (Abstract).
"Data on Plastic Packaging Materials for Food," H. Sugawara (Akita Prefectural Fermentation Research Institute) *Konbatekku*, Apr. 1994, pp. 1–7. (Translation).
"Synthesis of Chemically Modified Cyclodextrins," Alan P. Croft et al., Tetrahedron Report Number 147, Department of Chemistry, Texas Tech University, Lubbock, TX 79409, U.S.A. (Oct. 4, 1982), pp. 1417–1474.
"Application of cyclodextrin to insecticides, fungicides and aromatic films," I. Shibanai et al., *Gosei Jushi*, 34(4), pp. 2–9. (Abstract).
"Dispersion of b–cyclodextrin inclusion compound in polyethylene and manufacture of its blown films, " D. Xu et al., *Gaofenzi Cailiao Kexue Yu Gongcheng*, 7(6), pp. 39–43. (Abstract).
"β–Cyclodextrin Matrix Films for Colon–Specific Drug Delivery, " v. Siefke et al., *Proceed. Intern. Symp. Control. Rel. Bioact. Mater.*, 20 (1993), Controlled Release Society, Inc., pp. 182–184.
"Use of CDS in Plastics & Paper," *Cyclodextrin News*, vol. 3, No. 7 (Mar. 1989).

"Practical Application of Cyclodextrine to the Production of Insecticide, Mold Control and Fragrant Plastic Films," I. Shibanai et al., Japan Liquid Crystal. Co., Ltd.
"Polymer Inclusion Compounds by Polymerization of Monomers in b–Cyclodextrin Matrix in DMF Solution," M. Maciejewski et al., *J. Macromol. Sci.–Chem.*, A13(1), pp. 87–109 (1979).
"The thin of fluroine–containing polymer having cyclodextrin prepared by Langmuin Blodgett technique," M. Tamura et al., *Chem. Lett.*, (7), 1313–16. (Abstract).
"Surface–active properties of b–lactoglobulin: adsorption and rearrangement of glycosylated derivatives in surface films," Ralph D. Waniska et al., *J. Colloid Interface Sci.* , 117(1), pp. 251–257. (Abstract).
"Preparation and properties of insoluble films of cyclodextrin condensation polymers," W. Kutner et al., *J. Inclusion Phenom. Mol. Recognit. Chem.*, 13(3), pp. 257–265.
"Basic Concepts of Permeation Processes," *Recent Developments in Separation Science*, pp. 107–155.
"Permeablility Coeffecients," H. Yasuda et al., pp. 229–240.
"Permeation, Diffusion, and Sorption of Gases and Vapors," R. M. Felder et al., *Methods of Experimental Physics*, vol. 16c, Copyright 1980 by Academic Press, Inc.
"Chapter 1 The Simple Transport Laws," *Diffusion and Sorption Fibers and Films*, pp. 3–11.
"Chapter 14 Convective Diffusion to a Solid Surface," *Diffusion and Sorption in Fibers and Films*, pp. 172–192.
"Fundamentals of gas permeation," D. L. MacLean et al., *Hydrocarbon Processing*, Aug. 1983.
Barrier Polymers, Kirk–Othmer, Encyclopedia of Chemical Technology, Fourth Edition, vol. 3, pp. 931–962.
Chinodex® Cyclodextrins, Chinoin Pharmaceutical and Chemical Works Ltd. pp. 1–40.
"Solubility of Gases in Polyethylene," A. S. Michaels et al., *Journal of Polymer Science*, vol. L, pp. 393–412 (1961).
"Sorption and Flow of Gases in Polyethylene," A. S. Michaels et al., *Journal of Polymer Science*, vol. XLI, pp. 53–71 (1959).
"Analysis of Transient Sorption and Permeation of Small Molecules in Multiphase Polymer Systems," J. M. Ottino et al., *Polymer Engineering and Sciences*, vol. 24, No. 2, pp. 153–161 (1984).
"Mechanical Properties and Permeability of Polypropylene and Poly(ethylene terephthalate) Mixtures," P. Bataille et al., *Polymer Engineering and Science*, vol. 27, No. 9 (1987).
"Permeation of Pure Gases under Pressure through Asymmetric Porous Membranes. Membrane Characterization and Prediction of Performance," R. Rangarajan et al., *Ind. Eng. Chem. Process Des. Dev.*, vol. 23, No. 1 (1984), pp. 79–87.
*Polymer Handbook*, J. Brandrup et al. Interscience Publishers.
"Trends in Barrier Design," *Packaging*, May 1991, pp. 30–38.
"Barrier Packaging Technologies—What are the Alternatives?", Ronald H. Foster, Session 5 Design for Plastics Packaging.
"Minimizing Plastic Package/Product Interactions—An Unfilled Need," John D. Culter, *Journal of Plastic Film&Sheeting*, vol. 8, Jul. 1992, pp. 208–226.
"Interaction Between Packaging Materials and Foods," Chaim H. Mannheim et al., *Packaging Technology and Science*, vol. 3, pp. 127–132 (1990). "Packaging for Flavour Retention and Protection from Odours," W. Guise, *Packaging* , Aug. 1992, pp. 9–13.

"The Odour Barrier Performance of Packaging Films," M.G.R. Zobel, *Packaging*, Dec. 1986, pp. 22–25.

"Barrier Media," J. Rellmann et al., *Kunststoffe German Plastics*, 82 (1992), pp. 3–9.

"Recycled Polymers in Food Packaging: Migration Considerations," Timothy H. Begley et al., *Food Technology*, Nov. 1993, pp. 109–112.

"Migration of plasticizers from printing inks into foods," Laurence Castle et al., *Food Additives and Contaminants*, vol. 6, No. 4 (1989) pp. 437–443.

"Method for Evaluating Package–Related Flavors," Lisa J. Thompson et al., *Food Technology*, Jan. 1994, pp. 90–94.

"Off–flavours'in foods, a summary of experience: 1948–74," N. Goldenberg et al., *Chemistry and Industry*, Jul. 5, 1975, pp. 551–557.

"Organoleptic and Migrational Properties of PP Films Produced with Various Amounts of Scrap," F. Lox et al., *Packaging Technology and Science*, vol. 5, pp. 307–312 (1992).

"Nylon Film in Food Packaging," *Paper, Film&Foil Converter*, p. 62.

"Optimizing the Value and Benefits of Packaging Films," R. Marsili, *Food Product Design*, Nov. 1993, pp. 63–75.

"Materials", *Modern Plastics International*, Jul. 1992, p. 50.

"Chapter 1 An Overview of Food and Food Packaging Interactions," Joseph H. Hotchkiss, *American Chemical Society*, 1988, pp. 1–10.

"Chapter 2 Transport of Apple Aromas in Polymer Films, " P. T. DeLassus et al., *American Chemical Society*, 1988, pp. 11–27.

J. Landois–Garza et al., *American Chemical Society*, 1988.

"Cyclodextrin Inclusion Compounds in Research and Industry, " Wolfram Saenger, *Angew. Chem. Int. Ed. Engl.*, 19, pp. 344–362, 1980.

"Dow Eyes An Entry Into Fuel Tank Resin Supply", April 1998, p. 12.

"Steel vs. Plastics: The Competition for Light–Vehicle Fuel Tanks", Peter J. Alvarado, *JOM* , 48 (7) (1996), pp. 22–25.

"Permeation of gasoline–alcohol fuel blends through high–density polyethylene fuel tanks with different barier technologies", Daniel J. Kathios et al., Source: SAE Technical Paper Series. Publ by SAE, Warrendale, PA, pp. 1–14. Abstract Only.

"Gasoline vapours barrier process for plastic tanks and testing methods", A. Addeo et al., Source: Proceedings-Society of Automotive Engineers, Publ by SAE, Warrendale, PA, pp. 507–516. Abstract Only.

"Laminar Barrier Technology for Blow Molding Plastic Fuel Tanks", Richard L. Bell, Source: Publ by Soc of Plastics Engineers, Brookfield Cent, CT, pp. 95–97. Abstract Only.

"Direct In–Line Fluroination of HDPE Fuel Tanks", K. J. . Kallish, Source: Annual Technical Conference —Society of Plastics Engineers 43rd. Publ by Soc of Plastics Engineers, ANTEC '85, Washington, DC, Abstract Only.

"Worldwide Status of HDPE Fuel Tanks", D.L. Peters, Source: Publ by Soc of Plastics Engineers, Brookfield Center, CT, pp. 403–420. Abstract Only.

"Development of plastic fuel tank using modified multi–layer blow molding", K. Fukuhara et al., Source: SAE Technical Paper Series. Publ by SAE, Warrendale, PA. Abstract Only.

"Vehicle Emissions Laboratory" article.

PEC, "Joint R&D Projects at the Advanced Technology and Research Institute" article.

Environmental Test Center —Chrysler, Auburn Hills, Michigan Data Sheet.

Mitsubishi Motors Australia Ltd. Vehicle Emissions Laboratory Data Sheet.

Environment Protection Authority of Victoria Data Sheet.

SHED —Sealed Housing for Evaporative Determination article.

Clean Air Act Amendments —Control of Evaporative Emissions article.

"Dynamic mechanical measurement yields a better HDPE fuel tank.", Charles L. Rohn, Source: Modern Plastics v 66 n 10 Oct. 1989, pp. 129, 131–132. Abstract Only.

"Six layers are impervious", K. Esser, K. et al., Source: Kunststoffe Plast Europe v. 86 n 8 Aug. 1966, pp. 9–11. Abstract Only.

"Development and Economical Production of Plastic Fuel Tanks by Extrusion Blow Molding" H. Siewert, Source: Annual Technical Conference —Society of Plastics Engineers 42nd. Publ by Soc of Plastics Engineers, Brookfield Center, CT, pp. 942–946. Abstract Only.

"Development of Multi–layer Plastic Fuel Tanks for Nissan Research Vehicle–II", Y. Kurihara et al., Source: SAE Technical Paper Series Publ by SAE, Warrendale, PA. Abstract Only.

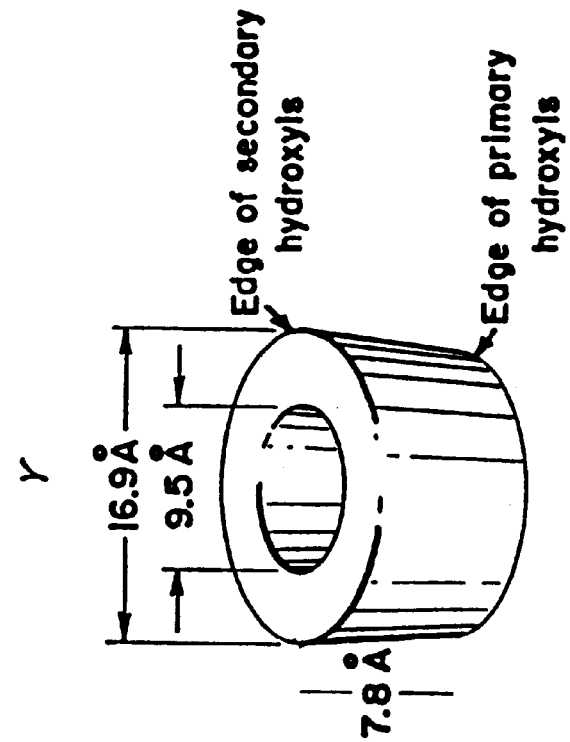
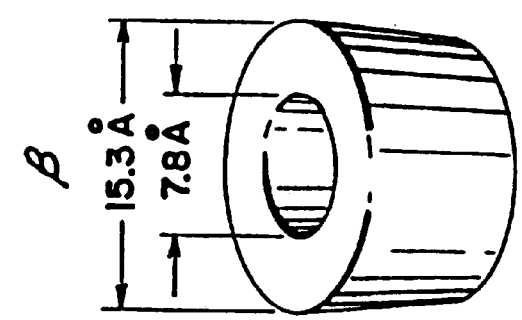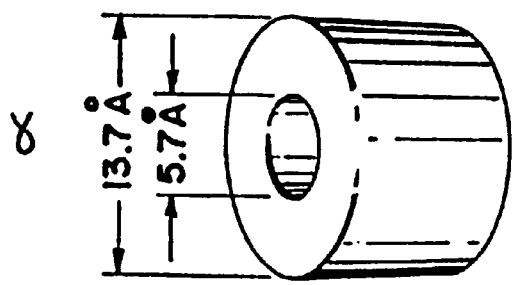
Dimensions of cyclodextrins

RIGID POLYMERIC BEVERAGE BOTTLES WITH IMPROVED RESISTANCE TO PERMEANT ELUTION

This application is a Divisional of application Ser. No. 09/189,217, filed Nov. 10, 1998, now U.S. Pat. No. 6,136,354, which application is a Divisional of application Ser. No. 08/931,324, filed Sep. 16, 1997, now U.S. Pat. No. 5,837,339, which application is a Continuation-in-Part of application Ser. No. 08/264,771, filed Jun. 23, 1994, now U.S. Pat. No. 4,492,947, which applications are incorporated herein by reference.

This application is a continuation-in-part of Wood et al., U.S. Ser. No. 08/264,771 filed Jun. 23, 1994.

FIELD OF THE INVENTION

The invention relates to a beverage bottle comprising a rigid thermoplastic monolayer, bilayer or multilayer container having in at least one layer an amount of a substituted or modified cyclodextrin that prevents the passage of a permeant, or the elution of a soluble material from the thermoplastic into the liquid container contents. The invention also relates to biaxially oriented thermoformed polyolefin or polyester thermoplastic beverage containers resistant to the movement or passage of a permeant into the beverage and resistant to the extraction or elution of beverage soluble materials from the polyester web into the beverage.

BACKGROUND OF THE INVENTION

Rigid, or semirigid, thermoplastic beverage containers have been known for many years. One example of such containers are high density polyethylene milk containers that have a capacity of a quart, a gallon or other common sizes. These containers typically comprise high density polyethylene. High density polyethylene is made from an ethylene stream using a Ziegler-Natta catalyst in either liquid phase or gas phase processes. Other vinyl polymers, can also be used in formulating these beverage containers including polymers made from such monomers including ethylene, propylene, butylene, butadiene, styrene and others. Such materials often contain small concentrations of residual monomers, contaminants in the olefin feed, catalyst residues and other contaminants. Such containers are typically blow molded using common thermoforming technology to shape a preform into a finished bottle or container.

Biaxially oriented blow molded thermoformed polyester beverage containers are disclosed in J. Agranoff (Ed) Modern Plastics, Encyclopedia, Vol. 16, No. 10A, P. (84) pp. 192–194. These beverage containers are typically made from a polyester material. Such polyesters are commonly made from a diol such as ethylene glycol, 1,4-butane diol, 1,4-cyclohexane diol and other diols copolymerized with an organic diacid compound or lower diester thereof such as terephthalic acid, 2,6-naphthalene dicarboxylic acid etc. The condensation/polymerization reaction occurs between the dicarboxylic acid, or a dimethyl ester thereof and the glycol material in a heat driven reaction that releases water or methanol as a reaction by-product leaving the high molecular weight polyester material. Typically, bulk polyester is injection blow molded over a steel-core rod or are formed into a preform containing the polyester. The preform is introduced into a blow molding machine wherein the polyester is heated and blown to an appropriate shape and volume for a beverage container the preform can be a single layer material, can be a bilayer or multilayer preform. Such preforms can form bilayer or multilayer bottles.

The thermoplastic polyester is a high molecular weight material, but can contain a large variety of relatively low molecular weight compound, substantially less than 500 grams per mole. These compounds can be extractable into beverage within the container. These beverage extractable materials typically comprise impurities in feed streams of the diol or diacid used in making the polyester. Further, the extractable materials can comprise degradation by-products of the polymerization reaction, the preform molding process or the thermoforming blow molding process. Further, the extractable materials can contain residual diester, diol or diacid materials including methanol, ethylene glycol, terephthalic acid, dimethyl terephthalic, 2,6-naphthalene dicarboxylic acid and esters or ethers thereof. Relatively low molecular weight oligomeric linear or cyclic diesters, tri-esters or higher esters made by reacting one mole of ethylene glycol with one mole of terephthalic acid may be present. These relatively low molecular oligomers can comprise two or more moles of diol combined with two or more moles of diacid. Schiono, *Journal of Polymer Science: Polymer Chemistry Edition*, Vol. 17, pp. 4123–4127 (1979), John Wiley & Sons, Inc. discusses the separation and identification of PET impurities comprising poly(ethylene terephthalate) oligomers by gel permeation chromatography. Bartl et al., "Supercritical Fluid Extraction and Chromatography for the Determination of oligomers and Poly(ethylene terephthalate) Films", *Analytical Chemistry*, Vol. 63, No. 20, Oct. 15, 1991, pp. 2371–2377, discusses experimental supercritical fluid procedures for separation and identification of a lower oligomer impurity from polyethylene terephthalate films.

Beverages containing these soluble/extractables, when consumed by the public, can exhibit an off-taste, a changed taste or even, in some cases, reduced taste due to the presence of extractable compounds. The extractable compounds can add to or interfere with the perception of either the aroma note or flavor notes from the beverage material. Additionally, some substantial concern exists with respect to the toxicity or carcinogenicity of any organic material that can be extracted into beverages for human consumption.

The technology relating to compositions used in the manufacture of beverage containers is rich and varied. In large part, the technology is related to coated and uncoated polyolefin containers and to coated and uncoated polyester that reduce the permeability of gases such as carbon dioxide increasing shelf life. The art also relates to manufacturing methods and to bottle shape and bottom configuration. Deaf et al., U.S. Pat. No. 5,330,808 teach the addition of a fluoroelastomer to a polyolefin bottle to introduce a glossy surface onto the bottle. Visioli et al., U.S. Pat. No. 5,350,788 teach methods for reducing odors in recycled plastics. Visioli et al. disclose the use of nitrogen compounds including polyalkylenimine and polyethylenimine to act as odor scavengers in polyethylene materials containing a large proportion of recycled polymer.

Wyeth et al., U.S. Pat. No. 3,733,309 show a blow molding machine that forms a layer of polyester that is blown in a blow mold. Addleman, U.S. Pat. No. 4,127,633 teaches polyethylene terephthalate preforms which are heated and coated with a polyvinylidene chloride copolymer latex that forms a vapor or gas barrier. Halek et al., U.S. Pat. No. 4,223,128 teaches a process for preparing polyethylene terephthalate polymers useful in beverage containers. Bonnebat et al., U.S. Pat. No. 4,385,089 teaches a process for preparing biaxially oriented hollow thermoplastic shaped articles in bottles using a biaxial draw and blow molding technique. A preform is blow molded and then maintained in contact with hot walls of a mold to at least partially reduce internal residual stresses in the preform. The preform can be cooled and then blown to the proper size in a second blow molding operation. Gartland et al., U.S. Pat. No. 4,463,121 teaches a polyethylene terephthalate polyolefin alloy having increased impact resistance, high temperature, dimensional stability and improved mold release. Ryder, U.S. Pat. No. 4,473,515 teaches an improved injection blow molding apparatus and method. In the method, a parison or preform is formed on a cooled rod from hot thermoplastic material. The preform is cooled and then transformed to a blow molding position. The parison is then stretched, biaxally oriented, cooled and removed from the device. Nilsson, U.S. Pat. No. 4,381,277 teaches a method for manufacturing a thermoplastic container comprising a laminated thermoplastic film from a preform. The preform has a thermoplastic layer and a barrier layer which is sufficiently transformed from a preformed shape and formed to a container. Jakobsen et al., U.S. Pat. No. 4,374,878 teaches a tubular preform used to produce a container. The preform is converted into a bottle. Motill, U.S. Pat. No. 4,368,825; Howard Jr., U.S. Pat. No. 4,850,494; Chang, U.S. Pat. No. 4,342,398; Beck, U.S. Pat. No. 4,780,257; Krishnakumar et al., U.S. Pat. No. 4,334,627; Snyder et al., U.S. Pat. No. 4,318,489; and Krishnakumar et al., U.S. Pat. No. 4,108,324 each teach plastic containers or bottles having preferred shapes or self-supporting bottom configurations. Hirata, U.S. Pat. No. 4,370,368 teaches a plastic bottle comprising a thermoplastic comprising vinylidene chloride and an acrylic monomer and other vinyl monomers to obtain improved oxygen, moisture or water vapor barrier properties. The bottle can be made by casting an aqueous latex in a bottle mold, drying the cast latex or coating a preform with the aqueous latex prior to bottle formation. Kuhfuss et al., U.S. Pat. No. 4,459,400 teaches a poly(ester-amid) composition useful in a variety of applications including packaging materials. Maruhashi et al., U.S. Pat. No. 4,393,106 teaches laminated or plastic containers and methods for manufacturing the container. The laminate comprises a moldable plastic material in a coating layer. Smith et al., U.S. Pat. No. 4,482,586 teaches a multilayer of polyester article having good oxygen and carbon dioxide barrier properties containing a polyisophthalate polymer. Walles, U.S. Pat. Nos. 3,740,258 and 4,615,914 teaches that plastic containers can be treated, to improve barrier properties to the passage of organic materials and gases such as oxygen, by sulfonation of the plastic.

Further, we are aware that the polyester has been developed and formulated to have high burst resistance to resist pressure exerted on the walls of the container by carbonated beverages. Further, some substantial work has been done to improve the resistance of the polyester material to stress cracking during manufacturing, filling and storage.

Beverage manufacturers have long searched for improved barrier material. In larger part, this research effort was directed to carbon dioxide ($CO_2$) barriers, oxygen (O2) barriers and water vapor ($H_2O$) barriers. More recently original bottle manufacturers have had a significant increase in sensitivity to the presence of beverage extractable or beverage soluble materials in the resin or container. This work has been to improve the bulk plastic with polymer coatings or polymer laminates of less permeable polymer to decrease permeability. However, we are unaware of any attempt at introducing into bulk polymer resin or polyester material of a beverage container, an active complexing compound to improve barrier properties or to trap water soluble material to prevent their extraction or elution into the carbonated beverage.

Even with this substantial body of technology, substantial need has arisen to develop biaxially oriented thermoplastic polymer materials for beverage containers that can substantially reduce the passage of permeants in the extractable materials that pass into beverages intended for human consumption.

Brief Discussion of the Invention

I have found that the barrier or trapping properties of polymeric beverage bottles preferably polyolefin or polyester biaxially oriented polymeric beverage container can be improved. Specifically, the resistance to extraction of soluble materials from the bulk polymer into the beverage, can be improved, without any important reduction and clarity, processability or structural properties, through the use of a modified cyclodextrin or compatible cyclodextrin derivative incorporated into or coated on the beverage container polymer material. We have found that the cyclodextrin material can increase the barrier properties of the polymer material by trapping permeants in an internal hydrophobic space in the cyclodextrin molecule. Further, any small molecule or oligomer impurity present in the container thermoplastic, that can be extracted by the beverage, can also be trapped in the cyclodextrin before the impurity material can migrate to the beverage.

In this technology, the cyclodextrin material can be incorporated, dispersed or suspended in the bulk polymer used to make the plastic bottle, the cyclodextrin can be incorporated, suspended or dispersed in a second thermoplastic layer than can be coextruded with the thermoplastic material forming the bottle. Lastly, the cyclodextrin material can be used in an aqueous or solvent based liquid coating material that can be added to the bottle in the preform stage or in the fully formed bottle stage. Preferred containers comprise a high density polyethylene milk container and a PET/polyacrylonitrile bilayer bottle or container.

Preferably the cyclodextrin material is used in the form of a compatible derivatized cyclodextrin. The cyclodextrin molecule without a compatible substituent often is not sufficiently compatible in the bulk polymer material to result in a clear, useful trapping or barrier layer in the packaging material. The compatible cyclodextrin derivative is a compound substantially free of an inclusion complex. For this invention, the term "substantially free of an inclusion complex" means that the quantity of the dispersed cyclodextrin material in the bulk polymer contains a large fraction having cyclodextrin free of a polymer contaminant, a permeant or other inclusion compound in the interior of the cyclodextrin molecule. A cyclodextrin compound is typically added and blended in the bulk polymer without any inclusion compound but some complexing can occur during manufacture. Such complexing can occur as polymer impurities and degradation materials become the inclusion compound in a cyclodextrin inclusion complex.

The preferred cyclodextrin is a derivatized cyclodextrin having at least one substituent group bonded to the cyclodextrin molecule that is compatible with the bulk polymer. Cyclodextrin is a cyclic dextrin molecule having six or more glucose moieties in the molecule. Preferably, the cyclodextrin is an alpha cyclodextrin ($\alpha$-CD), a beta cyclodextrin ($\beta$-CD), and delta cyclodextrin ($\delta$-CD) or mixtures thereof. We have found that the derivatization of the cyclodextrin molecule results in improved blending into the thermoplastic bulk polymer with no loss in clarity, processability, or structural or packaging property in the bulk polymer. The substituents on the cyclodextrin molecule are selected to possess a composition, structure and polarity to match that of the polymer to ensure the cyclodextrin is sufficiently compatible in the polymer material. Further, I have found that derivatized cyclodextrin can be blended into thermoplastic polymer, formed into semirigid or rigid containers of the invention using conventional thermoplastic blow molding/thermoforming manufacturing techniques. Lastly, we have found that the cyclodextrin material used in a variety of aspects of the invention, can be used in forming such thermoplastic beverage containers without any substantial reduction in structural properties.

The first aspect of the invention comprises a thermoplastic polymer pellet having a major proportion of the thermoplastic beverage polyester material having a sufficient amount of the cyclodextrin material to improve barrier properties and to serve as a trap for polymer impurities. A second aspect of the invention comprises a thermoplastic beverage container comprising a thermoplastic polyester having a major proportion of the polymeric material and a minor but effective amount of the cyclodextrin material to improve barrier properties and to act as a trap for polymer impurities. The third aspect of the invention comprises a beverage container comprising a major proportion of a structural thermoplastic polymer having a second laminate layer comprising a thermoplastic layer comprising a thermoplastic polymer and an effective amount of a cyclodextrin material to improve barrier properties to the beverage container and to act as a trap for polymer purities in the laminate structure of the beverage container. A last aspect of the invention comprises a beverage container comprising a thermoplastic structure having an internal coating comprising a film forming material having an effective amount of a cyclodextrin material that can provide and improve barrier properties or act as a trap for the impurities in the beverage container.

BRIEF DISCUSSION OF THE DRAWING

FIG. 1 is a graphical representation of the dimensions of the cyclodextrin molecule without derivatization. The central pore comprises the hydrophilic space or volume within the cyclodextrin molecule that can be the site for absorption of a permeant or contaminant. The alpha, beta and gamma cyclodextrins are shown.

FIG. 2 is an isometric view of a two liter polyester bottle having a second layer on the thermoplastic comprising a polymer and an effective amount of cyclodextrin derivative.

DETAILED DISCUSSION OF THE INVENTION

We have found that useful engineering thermoplastic polymer resins can be improved for applications involving packaging beverages. We have found that a modified cyclodextrin material with the polymer obtains has improved barrier properties and a reduced tendency to release polymer residue by extraction into the bulk beverage liquid. The polyester material useful in common engineering plastics of the invention is a condensation/polymerization product of a diacid and a polyol. The product preferably employs an aromatic compound diacid such as a phthalate or naphthalate. The major diacids used in the polymers of the invention are terephthalic acid (1,4-benzyene dicarboxylic acid) or 2,6-naphthalene dicarboxylic acid. However, other phthalic acids and naphthalene dicarboxylic acids can be used such as orthophthalic acid, 1,7-naphthalene dicarboxylic acid etc. Polyesters are typically referred to as aromatic-aliphatic or aromatic according to the copolymerized diol. Thus, polyethylene terephthalate chemical abstract No. 25038-59-9 (PET), poly (butylene terephthalate) chemical abstract No. 24968-12-5 (PBT) and related polymers are termed aromatic-aliphatic polyesters. Poly(bisphenol A-phthalate) is called an aromatic polyester resin or a polyarlate resin. PET, PBT and poly (ethylene-2,6-naphthalene dicarboxylate resins) (PEN) are the largest volume aromatic aliphatic products. Other aromatic aliphatic products include Eastman Kodak's Kodar® resin which is a PET resin modified with isophalate and dimethyl cyclohexane. Polyarlate resins are a lower volume special resins for high temperature (HDT) end uses. A preferred polyethylene terephthalic resin is typically made by a transesterification reaction of dimethyl terephthalate with ethylene glycol or 1,4-butane diol in the presence of a trace amount of a metal ion catalyst.

The methanol byproduct from the transesterification is collected overhead and the neat resin is extruded from the reactor in a batch of continuous process. The product PET resin has an intrinsic viscosity ($\eta$) that ranges from about 0.72–0.85 dL/g. Often bottle grade PET resin, during manufacture, is heated under inert ambient atmosphere to promote further polymerization in the resin.

Polyester bottles are typically produced by injection blow molding. Two manufacturing techniques are typically used. In one method, a preform is made by injection mold techniques in a preformed shape having the neck and screw-cap portion of the bottle in approximately useful size but having the body of the preform substantially smaller than the final bottle shape. A single component or bilayer preform can be used. The preform is then inserted into a blow molding machine where it is heated and then blown into the appropriate shape. Alternatively, the resin can be injection below molded over a steel-core rod. The neck of the bottle is formed with the proper shaped received closures (cap) and resin is provided around the temperature conditioned rod for the blowing step. The rod with the resin is indexed into the molding and the resin is blown away from the rod against the mold walls. The resin cools in contact with the mold while into the transparent bottle. The finished bottle is ejected and the rod is moved again in the injection molding station. This process is favored for single cylindrical bottles but typically can not be used to introduce complex shapes such as handles into a bottle.

The most common machine involves a four station apparatus that can inject resin, blow the resin into the appropriate shape, strip the formed container from the rod and recondition the core rod prior to the repeat of the process. Such containers are typically manufactured with the closure fitment portion comprising a threaded neck adapted to a metal screw cap. The bottle bottom typically has a lobed design such as a four lobe or five lobe design to permit the bottle be placed in a stable upright position. Alternatively, the molded bottles, having a hemispherical bottom, can be adhesively bonded to a polyethylene or polypropylene base cut to provide placement stability.

Cyclodextrin

The thermoplastic films of the invention contain a modified substituted or derivatized cyclodextrin having pendent moieties or substituents that render the cyclodextrin material compatible with the thermoplastic polyester polymer. For this invention, compatible means that the cyclodextrin material can be uniformly dispersed into the melt polymer, can retain the ability to trap or complex permeant materials or polymer impurity, and can reside in the polymer without substantial reductions in polymer film barrier properties or container forming characteristics. Compatibility can be determined by measuring polymer characteristics such as tensile strength, tear resistance, etc., permeability or transmission rates for permeants, surface smoothness, clarity, etc. Qualitative compatibility screening can be obtained by preparing small batches (100 grams-one kilogram of thermoplastic and substituted cyclodextrin). The blended material is extruded at production temperatures as a linear strand extrudate having a diameter of about one to five mm. Incompatible cyclodextrin materials will not disperse uniformly in the melt and can be seen in the transparent melt polymer immediately upon extrusion from the extrusion head. We have found the incompatible cyclodextrin can degrade at extrusion temperatures and produce a characteristic "burnt flour" odor in an extrusion. Further, we have found that incompatible cyclodextrin can cause substantial melt fracture in the extrudate which can be detected by visual inspection. Lastly, the extrudate can be cut into small pieces, cross-sectioned and examined using an optical microscope to find incompatible cyclodextrin clearly visible in the thermoplastic matrix.

Cyclodextrin is a cyclic oligosaccharide consisting of at least five, preferably six glucopyranose units joined by α(1→4) linkages. Although cyclodextrin with up to twelve glucose residues are known, the three most common homologs (α cyclodextrin, β cyclodextrin and γ cyclodextrin) having 6, 7 and 8 residues have been used.

Cyclodextrin is produced by a highly selective enzymatic synthesis. They commonly consist of six, seven, or eight glucose monomers arranged in a donut shaped ring, which are denoted α, β, or γ cyclodextrin respectively (See FIG. 1). The specific coupling of the glucose monomers gives the cyclodextrin a rigid, truncated conical molecular structure with a hollow interior of a specific volume. This internal cavity, which is lipophilic (i.e.,) is attractive to hydrocarbon materials (in aqueous systems is hydrophobic) when compared to the exterior, is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

CYCLODEXTRIN (CD) TYPICAL PROPERTIES

| PROPERTIES | α-CD | β-CD | γ-CD |
|---|---|---|---|
| Degree of Polymerization (n =) | 6 | 7 | 8 |
| Molecular Size (Å) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]_D^{25}$ | +150.5 | +162.5 | +177.4 |
| Color of iodine complex | Blue | Yellow | Yellowish Brown |
| Solubility in water (g/100 ml) 25° C. | | | |
| Distilled Water | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The torus interior is hydrophobic due to the presence of methylene (—CH$_2$—) and ether (—O—) groups. The parent cyclodextrin molecule, and useful derivatives, can be represented by the following formula (the ring carbons show conventional numbering) in which the vacant bonds represent the balance of the cyclic molecule:

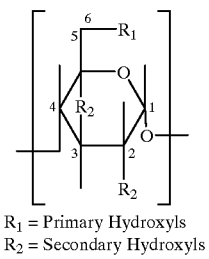

R$_1$ = Primary Hydroxyls
R$_2$ = Secondary Hydroxyls wherein R$_1$ and R$_2$ are primary or secondary hydroxyl respectively as shown.

Cyclodextrin molecules have available for reaction with a chemical reagent the primary hydroxyl at the six position, of the glucose moiety, and at the secondary hydroxyl in the two and three position. Because of the geometry of the cyclodextrin molecule, and the chemistry of the ring substituents, all hydroxyl groups are not equal in reactivity. However, with care and effective reaction conditions, the cyclodextrin molecule can be reacted to obtain a derivatized molecule having all hydroxyl groups derivatized with a single substituent type. Such a derivative is a persubstituted cyclodextrin. Cyclodextrin with selected substituents (i.e.) substituted only on the primary hydroxyl or selectively substituted only at one or both the secondary hydroxyl groups can also be synthesized if desired. Further directed synthesis of a derivatized molecule with two different substituents or three different substituents is also possible. These substituents can be placed at random or directed to a specific hydroxyl. For the purposes of this invention, the cyclodextrin molecule needs to contain sufficient thermoplastic compatible substituent groups on the molecule to insure that the cyclodextrin material can be uniformly dispersed into the thermoplastic and when formed into a clear film, sheet or rigid structure, does not detract from the polymer physical properties.

Apart from the introduction of substituent groups on the CD hydroxyl other molecule modifications can be used. Other carbohydrate molecules can be incorporated into the cyclic backbone of the cyclodextrin molecule. The primary hydroxyl can be replaced using SN$_2$ displacement, oxidized dialdehyde or acid groups can be formed for further reaction with derivatizing groups, etc. The secondary hydroxyls can be reacted and removed leaving an unsaturated group to which can be added a variety of known reagents that can add or cross a double bond to form a derivatized molecule. Further, one or more ring oxygen of the glycan moiety can be opened to produce a reactive site. These techniques and others can be used to introduce compatibilizing substituent groups on the cyclodextrin molecule.

The preferred preparatory scheme for producing a derivatized cyclodextrin material having a functional group compatible with the thermoplastic polymer involves reactions at the primary or secondary hydroxyls of the cyclodextrin molecule. Broadly we have found that a broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphato cyclodextrin, imidazoyl substituted cyclodextrin, pyridine substituted cyclodextrin, hydrocarbyl sulphur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well known groups. The formation of such groups on either the primary or secondary ring hydroxyls of the cyclodextrin molecule involve well known reactions. The acylation reaction can be conducted using the appropriate acid anhydride, acid chloride, and well known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin. Alkylating groups can be used to produce peralkylated cyclodextrin using sufficient reaction conditions exhaustively react available hydroxyl groups with the alkylating agent. Further, depending on the alkylating agent, the cyclodextrin molecule used in the reaction conditions, cyclodextrin substituted at less than all of the available hydroxyls can be produced. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant.

Tosyl(4-methylbenzene sulfonyl) mesyl (methane sulfonyl) or other related alkyl or aryl sulfonyl forming reagents can-be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyl. The sulfonyl chloride is used at appropriate mole ratios depending on the number of target hydroxyl groups in the molecule requiring substitution. Both symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents, halogen derivatives of cyclodextrins can be manufactured as a feed stock for the manufacture of a cyclodextrin molecule substituted with a compatibilizing derivative. In such compounds the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphato groups. The 2, and 3, secondary hydroxyls can be branched using an alkyl phosphato group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxeme isomers, formyl methyl and its oxeme isomers, carbylmethoxy (—O—CH$_2$—CO$_2$H), carbylmethoxymethyl ester (—O—CH$_2$CO$_2$—CH$_3$). Cyclodextrin with derivatives formed using silicone chemistry can contain compatibilizing functional groups.

Cyclodextrin derivatives with functional groups containing silicone can be prepared. Silicone groups generally refer to groups with a single substituted silicon atom or a repeating silicone-oxygen backbone with substituent groups. Typically, a significantly proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups and can be further substituted with a variety of functional groups. For the purposes of this invention the simple silicone containing substituent moieties are preferred including trimethylsilyl, mixed methyl-phenyl silyl groups, etc. We are aware that certain βCD and acetylated and hydroxy alkyl derivatives are available from American Maize-Products Co., Corn Processing Division, Hammond, Ind.

The preferred cyclodextrin derivative containing polyester beverage containers of the invention are commonly made by incorporating the modified cyclodextrin into a polyolefin or polyester resin that is then formed into a useful pellet. The pellet is then formed into a preform shape which is then converted into a biaxally oriented beverage container. Two techniques are typically used in manufacturing the bottles. First, a machine is used that converts the resin pellet into a preform formed on a heated rod. After conditioning, the preform is blown using the rod and in conjunction with the balance of the manufacturing equipment into the bottle. A second technique involves forming a preform from thermoplastic resin. Removing the resin from the preform manufacturing site and transferring the preform to a blow molding apparatus. The preform is then blown in biaxally oriented into a useful container shape. The container can be self supporting with a lobed bottom or can be adhesively bonded to a polyethylene or polypropylene base cup support. In an alternative embodiment, the finished beverage container can be at least a two layer laminate material. The laminate can contain in one layer a polyester material and in a second layer a barrier polymer. The derivatized cyclodextrin material can be in either layer or in both layers. In a third embodiment, a beverage container can comprise a biaxally oriented beverage container having a coating on the interior of the bottle. The coating can be placed in the preform having sufficient thickness to adequately cover the interior of the beverage container after blowing. Alternatively, the coating can be formed on the interior of the container after blow molding.

Raw material used in any of the thermoforming procedures is a pelletized thermoplastic polyester or polyolefin. The product of the transesterification reaction producing a thermoplastic polyester is in the form of a melt. The melt can be easily reduced to a useful pellet or other small diameter flake or particulate. The flake or particulate polyester can then be dried and blended with the derivatized cyclodextrin material until uniform and then melt extruded under conditions that obtain a uniform dispersion or solution of the modified or derivatized cyclodextrin and polyester material. The resulting polyester pellet is typically substantially clear, uniform and of conventional dimensions. The pellet preferably contains about 0.01 to about 10 wt-% of the modified cyclodextrin, preferably about 0.1 to about 5 wt-% of the modified cyclodextrin and under certain circumstances, the polyester can contain between 0.5 and 2 wt-% of the cyclodextrin material. The polyester pellet containing the modified cyclodextrin material then can be incorporated into the conventional preform or parison blow molding techniques. The products of these techniques contain similar proportions of materials.

Molecular orientation substantially improves the stiffness, ultimate tensile strength, yield strength, impact resistance, clarity and permeation resistance of many thermoplastic materials.

Biaxially oriented PET plastic carbonated soft drink bottle which is produced from polyethylene terephthalate using methods taught in Wyeth et al., U.S. Pat. No. 3,733,309 issued May 15, 1973 and entitled "Biaxially Oriented Poly (Ethylene Terephthalate) Bottle." The majority of the biaxially oriented PET beverage bottles are presently being produced by the so-called two stage "reheat blow" method, using a separate machine for each stage. In a first stage injection molding machine, PET parisons or preforms are first injection molded in a cooled mold, at melt temperatures of about 540° F., which is above the polymers melting point, and then cooled down and removed from the injection molding machine for later use as feed stock to a separate second stage reheat-blow machine, where the biaxially oriented bottle is produced. Upon entering the reheat blow machine, the cold parisons, whose shape resembles that of a test tube having a threaded bottle neck finish at its open ended top, are heated uniformly in an oven to its orientation temperature, which for PET is about 190° F. to 200° F. (which is below PET's melting point). The temperature conditioned parisons are then placed within cooled bottle blow molds which clamp the parisons by their necks upon closing off the blow molds. Metal pushrods are then inserted and pushed into the parisons through their open necks, and the parisons, whose initial lengths are shorter than that of the finished bottle, are stretched axially against the bottom of the blow molds to their final lengths, thereby effecting axial or longitudinal orientation. Radial or so-called "hoop direction" orientation is next achieved by introducing compressed air inside the axially stretched parisons to expand them outward and into contact with the cooled surfaces of the bottle blow molds. After cooling sufficiently for subsequent handling, the blow molds open and the biaxially oriented bottles are ejected from the machine. While this method is suitable for use with orientable thermoplastic, it requires a substantial capital investment in the injection molding machine and the reheat blow machine and its associated parison transfer equipment and heating ovens. Furthermore, a considerable amount of energy is consumed in reheating the cold parisons in the oven, which adds to the cost of the finished oriented articles.

The reheating step can be avoided if a so-called in-line single stage injection blow molding process were utilized to make biaxially oriented hollow articles using a single "hot parison" injection stretch-blow molding machine. In the "hot parison" in-line method, the parison is formed by injection molding, cooled to orientation temperature, and then stretched axially and blown radially to its final product shape, without ever being allowed to cool to room temperature. A number of such in-line "hot parison" injection stretch blowing methods and apparatus have been disclosed in the paten literature and as such constitute the prior art.

As set forth in A.J. Scalora, U.S. Pat. No. 3,470,282, a hot thermoplastic parison is first formed by injection molding the thermoplastic material, at a temperature above its melting point, over a generally cylindrical core, called an inner sleeve, which is positioned in the female cavity of an injection mold. The parison is then cooled, while on the core and within the injection mold, by suitable cooling means located therein, down to a narrow temperature range, which includes the preferred orientation temperature of the material being processed, said temperature range being relatively uniform and covering all points across the thickness and at the surfaces of the parison, and said temperature range also being below the thermoplastic materials homogenous melting temperature. The narrow temperature range for PET parisons would be about 190° F. to 200° F. After reaching its narrow orientation temperature range, the uniformly cooled parison is then removed from the injection mold and transferred, while still on the inner core, to a blow mold having cooling means therein. While in transit, or after being positioned within the closed blow molds, the parison is stretched axially by the outward extension of a valve located within the inner core over which the parison had been previously molded. Next, the parison is inflated, while positioned within the blow molds, thus stretching the parison along a second axis or direction of axial stretching. Stretching the thermoplastic parison at its orientation temperature, by longitudinal or axial extension of a valve within the core rod, and by radial inflation, sometimes referred to as "hoop stretching," yields a biaxially oriented hollow article.

The arrangement described above has the virtues of simplicity and energy conservation mentioned previously, but it cannot operate at the high production rates necessary for economical production. For example, the parison must first be brought to orientation temperature throughout its entire thickness. If the metal surfaces of the core and injection mold cavity are maintained at temperatures at or slightly below the orientation temperature range of the thermoplastic to be processed, 190° F. to 200° F. for PET, the parison will eventually be cooled to an equilibrium temperature condition corresponding to the desired orientation temperature range, across its thickness, wile it is still in the injection mold. However, the rate of cooling of the parison within the injection mold will be extremely slow because of the small temperature differential between the parison, the core, and the mold surfaces. Thus, the speed of operation of the apparatus will be limited by the long injection molding cycle required. In contrast, if the core and injection mold cavities are maintained at a much lower temperature, conventionally about 35° to 40° F. for PET, the rate of cooling will be increased substantially, but an uneven temperature distribution will be created across the thickness of the parison. Such rapid cooling of the parison, if accomplished within an economical and commercially feasible cycle time, will result in surface temperatures of the parison which are substantially below the orientation temperature range of the thermoplastic being processed and will actually approach the temperature of the core and the injection mold, while the middle or mid-point of the parison walls will be substantially above the desired orientation temperature range. Therefore, satisfactory orientation will not be achieved during the stretching and blowing of parisons which have such substantial mal-distributions of temperatures across their thickness, major portions of which lie outside the orientation temperature range of the thermoplastic being processed.

The cycle time limitations resulting from the slow parison or preform-cooling inherent in Scalora's teaching are overcome to a certain degree in other subsequently disclosed art. For example, in Valyi, U.S. Pat. Nos. 3,966,378 and 4,151, 248.

In U.S. Pat. No. 3,966,378, a parison is formed on a first core in an injection mold, cooled in the injection mold, transferred on said first core to a pre-blow mold and partially expanded against the inner surfaces of the pre-blow mold to a shape intermediate that of the parison and that of the finished article. Next, cooling is effected on the first core in the pre-blow mold to a uniform temperature across its thickness within the desired orientation temperature range of the thermoplastic being molded. The temperature conditioned parison is then transferred to a second blow core and later transferred to a third mold where it is axially stretched and expanded in the third mold, which is the final blow mold, to form a hollow biaxially oriented article. Separate parisons may be simultaneously injection molded, preblown, and cooled to orientation temperature, and finally stretch-blown, if multiple sets of cores and molds are utilized. Because the parison is not conditioned to a uniform orientation temperature across its thickness in the injection mold, the injection mold can operate at a reasonable and economical production rate. However, the necessity for additional preblown molds and additional cores and transfer means greatly complicates the apparatus and requires greater capital investment. Furthermore; pre-blowing to an intermediate shape is actually somewhat self-defeating in that it sacrifices the amount of orientation which may be subsequently imparted to the parison, since the degree of orientation which may be imposed is directly proportional to the amount of stretch which takes place after the parison has been brought to the desired orientation temperature, which in this case takes place in the pre-blow mold. Obviously, the amount of orientation-stretching which can be accomplished from stretching the parison's intermediate shape to its final shape is less than if the parison was stretched, at orientation temperature, from its original shape to its final shape.

In Valyi, U.S. Pat No. 4,151,248, the need for pre-blow molds with its attendant sacrifice in the levels of orientation which may be achieved, is avoided by a method for preparing hollow oriented plastic articles wherein a parison is formed and cooled rapidly on a first core in an injection mold to an average temperature suited for orientation but having unequal distribution of temperature across the walls of said parison, being cold on the outer surfaces and hot in the middle. Next, the cooled parison on said first core is transferred to a tempering mold where it is stripped from said first core and deposited in the tempering mold. The cooled parison is then conditioned or tempered in the temperature controlled tempering mold to equalize the temperature distribution across the walls of the parison and attain a uniform temperature distribution corresponding to the desired orientation temperature of the thermoplastic material being molded. The tempering is aided by insertion of a separate stretch-blow core into and against the parison, to provide pressure contact between the parison and the tempering mold, thereby speeding heat transfer between the two. The temperature conditioned parison is then transferred on the stretch-blow core to a third mold, which is the stretch blow mold, and is finally axially stretched by telescoping extension of said stretch-blow core, and then radially expanded and cooled in said stretch-blow mold, to form a biaxially oriented hollow article. Because the parison need not be conditioned to a uniform orientation temperature across its wall thickness in the injection mold, the parison may be removed from the injection mold early, and the injection molding step can be operated at a reasonable rate, and much faster then otherwise would be possible. However, the necessity for additional cores, molds, and transfer means greatly complicates the apparatus and substantially adds to the costs.

In Marcs, U.S. Pat. No. 3,776,991, a method for producing biaxially oriented hollow plastic articles in a rotary type injection molding machine is disclosed having at least four stations, wherein a parison is formed on a first core within an injection mold at the injection station, cooled in the injection mold to a temperature above the orientation temperature, indexed to an interim station on said first core where the parison is preblown against the cold surfaces of an interim mold, which is larger than the shape of the original parison but smaller than the shape of the final desired article, cooled in the interim mold to the optimum orientation temperature, indexed on said first core to a blow station and positioned within the final blow mold whose cavity is in the shape of the final desired article. The preblown parison is then axially stretched in the closed final blow mold by extension by a poppet valve stem located within said first core rod, and finally radially expanded outward to its final shape, against the cavity walls of the blow mold, and then cooled to a suitable ejection temperature. After opening the blow molds, the core rod and biaxially oriented article are indexed to an ejection station, where the biaxially oriented article is removed. This method dispenses with the need for additional cores taught by the Valyi patents, but still requires the use of a pre-blow, or interim mold and interim mold station, with their attendant complexities and high costs. In this method there is some sacrifice of the capability to impart high levels of orientation, because the article is stretched less in going from the interim shape to the final shape, as compared to the stretching possible in other techniques wherein the parison is stretched at orientation temperature from the original parison shape to the final article shape.

Marcus, U.S. Pat. No. 4,065,246, teaches another injection blow molding process employing at least three stations wherein the parison is formed on a core in an injection mold, cooled to the desired orientation temperature range while in the injection mold, transferred on the same core to the final blow mold and allowed to dwell therein to bring the parison to uniform orientation temperature while the outer tip of the parison is in contact with a temperature controlled stop, and the remainder of the parison, except for the inner surface of its tip, is expanded slightly off the core to aid in the removal of the first core from said parison, by momentarily introducing low pressure air inside the parison. Alternatively, Marcus teaches that lubricant may be used to aid in removal of the first core from the parison. Next, the first core is removed from the partially expanded parison, and a second core is inserted and extended outwardly therein to stretch the parison longitudinally and thereby axially orient the parison. High pressure air is then introduced within the axially stretched parison to expand it radially outward until it contacts the cool surfaces of the blow mold cavity where it assumes its final shape and is cooled to a suitable ejection temperature. The biaxially oriented article is then transferred on said second core to an ejection station where it is ejected from the apparatus. This process avoids the duplication of molds but requires the duplication of cores and transfer means, and extra stations, all of which add complexities and additional costs.

The methods disclosed in these patents are typical beverage container manufacturing methods. However, any method that can conveniently manufacture PET beverage container can be used with the pellets of the invention.

Similar to the methods shown above, a laminated bottle can be made having an exterior layer typically comprising a thermoplastic with an interior layer comprising a barrier polymer. Either the barrier polymer or the polyester material or both can contain the modified or derivatized cyclodextrin material as a permeant trapping molecule or as a contaminate trapping molecule. The barrier polymer material can be any conventional thermoplastic that can be formed with polyethylene terephthalate into a laminate beverage container.

Thermoplastic materials can be formed into barrier film layer in the bottle using a variety of processes. These methods are well known manufacturing procedures. The characteristics in the polymer thermoplastics that lead to successful barrier film formation are as follows. Skilled artisans manufacturing thermoplastic polymers have learned to tailor the polymer material for thermoplastic processing and particular end use application by controlling molecular weight (the melt index has been selected by the thermoplastic industry as a measure of molecular weight—melt index is inversely proportional to molecular weight, density and crystallinity). For blown thermoplastic extrusion polyolefins such as low density polyethylene (LDPE), linear low density polyethylene (LLDPE) or high density polyethylene (HDPE) are the most frequently used thermoplastic polymers, although polypropylene, nylon, nitriles and polycarbonate are sometimes used to make blown film. Polyolefins typically have a melt index from 0.2 to 3 grams/10 mins., a density of about 0.910 to about 0.940 grams/cc,. For biaxially oriented film extrusion the polymer most often used are olefin based—chiefly polyethylene and polypropylene (melt index from about 0.1 to 4, preferably 0.4 to 4 grams/10 mins. Polyesters and nylons can also be used. For casting, molten thermoplastic resin or monomer dispersion are typically produced from polyethylene or polypropylene. Occasionally, nylon, polyester and PVC are cast. For roll coating of aqueous based acrylic urethane and PVDC, etc. dispersions are polymerized to an optimum crystallinity and molecular weight before coating.

A variety of thermoplastic materials are also used. Such materials include polyacrylonitrile, poly(acrylonitrile-co-butadiene-co-styrene) polymers, acrylic polymers such as the polymethylmethacrylate, poly-n-butyl acrylate, poly (ethylene-co-acrylic acid), poly(ethylene-co-methacrylate), etc.; cellophane, cellulosics including cellulose acetate, cellulose acetate propionate, cellulose acetate butyrate and cellulose triacetate, etc.; fluoropolymers including polytetrafluoroethylene (TEFLON), poly(ethylene-co-tetrafluoroethylene) copolymers, (tetrafluoroethylene-co-propylene) copolymers, polyvinyl fluoride polymers, etc., polyamides such as nylon 6, nylon 6,6, etc.; polycarbonates; polyesters such as poly(ethylene-co-terephthalate), poly (ethylene-co-1,4-naphthalene dicarboxylate), poly (butylene-co-terephthalate); polyimide materials; polyethylene materials including low density polyethylene; linear low density polyethylene, high density polyethylene, high molecular weight high density polyethylene, etc.; polypropylene, biaxially oriented polypropylene; polystyrene, biaxially oriented polystyrene; vinyl films including polyvinyl chloride, (vinyl chloride-co-vinyl acetate) copolymers, polyvinylidene chloride, polyvinyl alcohol, (vinyl chloride-co-vinylidene dichloride) copolymers, specialty films including polysulfone, polyphenylene sulfide, polyphenylene oxide, liquid crystal polyesters, polyether ketones, polyvinylbutyrl, etc.

In making a laminate preform material having an exterior layer of a poly(ethylene-terephthalate) and an interior layer of a barrier polymer, a preform can be made through sequential injection molding techniques. The first step involves the injection molding of a first preformed section. The preform section can comprise either the barrier polymer or the polyethylene terephthalate container material. The preform can then be transferred to a second station wherein the complimentary polymer is either injection molded on the interior of the preform (barrier polymer inside PET) or formed on the exterior of the preform (PET over the barrier polymer). Such a multi-step formation can also be done on a single machine having the appropriate internal working components for such injection molding operations. Between stages in the operation, the preforms must be cooled to a sufficient temperature to permit successful manufacture. Additional layers can be used if desired, however, the preferably container is a two layer construction. The two or more layer preform material is then subjected to a reheat blow molding operation. The preform is reheated to a desirable temperature sufficient to permit blow molding into the desired shape. Not only does the blow molding operation achieved biaxial orientation of the layers, thereby improving strength, but also produces the desired end product, and shaped bottom if desired.

In the blow molding operation, the heat source is used either in the interior of or around the exterior of the bottle preform to reach an appropriate blow molding temperature. In the preferred embodiment, the injection molded by component preform is subject to a final forming operation including biaxial orientation through stretch blow molding at a temperature from about at an elevated blow molding temperature that is typically 95–150° C. A isothermal temperature profile across the layers of thermoplastic is desired. The temperature of blow molding should be sufficient to achieve satisfactory blow molding of both thermoplastic resins.

The cyclodextrin materials can be incorporated into a barrier cellulosic web by coating the cellulosic web or a similar structure containing a cellulosic layer with a liquid coating composition containing an effective amount of a cyclodextrin or substituted cyclodextrin. Such coating compositions are typically formed using a liquid medium. Liquid mediums can include an aqueous medium or organic solvent media. Aqueous media are typically formed by combining water with additives and components that can form a useful coatable aqueous dispersion. Solvent based dispersions based on organic solvents can be made using known corresponding solvent base coating technology.

In forming the barrier layers of the invention, coatings can be formed either on a film which is later laminated on a film which is later laminated onto the cellulosic web or can be coated to form a film on the cellulosic web. Such coating processes involve the application of liquid to a traveling cellulosic web. Such coating processes commonly use machines having an application section and a metering section. Careful control of the amount and thickness of the coating obtains optimized barrier layers without waste of material. A number of coating machines are known such as tension sensitive coaters, for example, coaters using a metering rod, tension insensitive coating stations that can maintain coat weight even as web tensions vary, brush coating methods, air knife coaters, etc. Such coating machines can be used to coat one or both sides of a flexible film or one or both sides of a cellulosic web.

Coating machines described above commonly apply a liquid composition containing a film forming material, additives that can help form and maintain the coating composition along with the effective amount of the cyclodextrin or substituted cyclodextrin material. The film forming materials are often called a binder. Such binders exist in the final coating as a polymer of high molecular weight. Thermoplastic polymers or crosslinking polymers can both be used. Such binders are grouped into certain overlapping classes including acrylic, vinyl, alkyl, polyester, etc. Further, the compositions described above are materials that can be used in forming the polymer films also have corresponding materials that can be used in the formation of aqueous and solvent based coating compositions. Such coating compositions can be made by combining the liquid medium with solid materials containing the polymer, the cyclodextrin and a variety of useful additives. Commonly, the cyclodextrin materials added to the coating composition as part of the solids component. The solids present in the coating composition can contain from about 0.01 to about 10 wt % of the cyclodextrin compound, preferably about 0.1 wt % to 5 wt %, most preferably about 0.1 wt % to about 2 wt % of the cyclodextrin material based on the total solids in the solvent based dispersion composition.

A useful barrier layer can also be made by coating the interior of either a preform or a formed container with a coating typically made from an aqueous dispersion or suspension of a useful polymer material containing the modified cyclodextrin material. In a preferred process, the preform or container is heated to 40° to 80° C., and in coated with an aqueous dispersion of a polymer, and dried.

The coating is applied at a temperature of 40° to 100° C., preferably 50° to 90° C. If the temperature is below 40° C., little advantage is obtained compared with coating a preform at a room temperature where only a very thin coating, e.g. about 3 $\mu$m thickness, of insufficient adhesion is obtained. If the preform is heat to above 90° C., then crystallization is likely to be induced which impairs satisfactory conversion of the preform into a biaxially oriented container during the blow molding operation and also gives rise to distortion of the container as a result of uneven relaxation of molding strains.

Notwithstanding the need to prevent an undue degree of bulk crystallization in the preform which would be caused by heating, it can be beneficial to encourage surface crystallization of the preform by pre-treatment with a suitable solvent, for example butanone (methyl ethyl ketone). Such treatment results in a surface roughness which aids the keying of subsequently applied coatings to the preform. The effect is directly proportional to both time and temperature of treatment, and with butanone for example a fine-scale (about 1 $\mu$m) roughness, associated with a well-developed spherulitic texture extending 30 to 50 $\mu$m inward from the surface, is obtained by treating at 40° to 90° C. for a period of 1 to 2 minutes.

Other solvents that may be used include acetone, chloroform ethyl acetate, m-cresol and trichloroethylene. By coating a temperature in the range 40 to 90° C. an adherent and uniform coating of greater thickness, e.g. of the order of 20 to 30 $\mu$m may be produced in a single coating step. If this thickness coating is inadequate, the coated perform may be given further coats after drying to give the necessary thickness. Preferably the coated article is reheated to 40 to 80° C. before applying such further coats.

In order to avoid undue heating of the amorphous PET during the drying of the aqueous dispersion, which heating could give rise to development of crystallinity in the PET preform, the drying is preferably conducted using an infrared heater operating at a temperature below 1000° C. At operating temperatures below 1000° C. the radiation will be absorbed by the water in the aqueous dispersion without unduly heating the PET preform itself: the water thus tends to act as a filter against infra-red radiation.

During the drying step, the preform or bottle may be rotated so as to provide even heating and also to provide an even thickness coating. Thus a PET preform in the form of a tube having one closed end may be mounted with its longitudinal axis horizontal and rotated about this longitudinal axis.

If desired multiple coatings may be applied continuously to the PET. Thus the preform or bottle may be mounted with its longitudinal axis horizontal and rotated about the longitudinal axis. As it rotates it is first heated by an infra-red heater to 40° to 90° C. and then it picks up a coating of the aqueous dispersion from a coating point, e.g. a flexible doctor knife, then the water is evaporated off, and the coated preform heated to 40° to 90° C., by means of one or more infra-red heaters mounted adjacent the rotating article so that the coating is dried and the preform reheated before one revolution of the preform is completed: hence on reaching the coating point on completion of one revolution, a further coating of the aqueous dispersion is applied over the dried coating. Thus a multilayer coating may be formed as a spiral on the preform.

The coating may be applied to the interior or exterior surface and may be applied by spraying or dip coating.

We have found coating the interior to be advantageous particularly where the resultant bottle is intended to contain carbonated beverages. Thus it presents a barrier layer between the beverage and bottle wall and so reduces the amount of carbon dioxide absorbed by the polyethylene terephthalate itself. This enables thinner coatings to be employed to achieve a specified carbon dioxide loss. Thus, in some cases, it is possible to employ a coating on the interior of the preform of thickness only half that which would be required on the outside of the preform to give a similar carbon dioxide loss.

Furthermore, when used to make bottles for carbonated beverages, there is a tendency for the carbon dioxide diffusing through the bottle wall to cause an exterior coating to lose adhesion after a period of time giving rise to blisters. In contrast, a coating on the interior surface will be held firmly in place, even if the adhesion is lost for some reason, by the pressure of the carbonated liquid.

The polymer dispersion may be any of those that are customarily employed for application of barrier coatings to plastic materials. Preferably it is an aqueous dispersion of a copolymer of vinylidene chloride with acrylonitrile and/or methyl acrylate optionally containing units derived from other monomers such as methyl methacrylate, vinyl chloride, acrylic acid or itaconic acid. Particularly useful vinylidene chloride copolymers are those containing 5 to 10% by weight of units derived from acrylonitrile and/or methyl acrylate, and optionally containing up to 10% by weight of units derived from an unsaturated carboxylic acid such as acrylic acid. The dispersions may preferably contain surfactants such as sodium alkyl sulphonates.

The containers of the invention can be used to distribute a variety of beverages including milk (skim, 1%, 2%, chocolate), orange juice, carbonated beverages, water, flavored water, carbonated water, beer, mixed alcoholic drinks, distilled spirits, wines, 200 proof grain or absolute alcohol; fruit juices such as apple, tomato, pear, etc.; distilled water, etc.

DETAILED DESCRIPTION OF THE DRAWINGS

FIG. 1 is a generally isometric view of a conceptual representation of the dimensions of the various cyclodextrin molecules. FIG. 1 shows an α, β and γ cyclodextrin showing the dimensions of the exterior of the cyclodextrin ring along with the dimensions of the interior pore volume that can act as a trapping site for permeants or polymer impurities. The figure shows that the primary and secondary hydroxyls exist on the edge of the circular form. This suggests that the interior of the cyclodextrin is relatively hydrophobic and adapted to complex and contain hydrophobic molecules.

FIG. 2 is a side view of a substantially transparent two liter carbonated beverage container. The container generally shown at 20 comprises a body 22, a base 24 and a cap portion 26. The overall shape of the container is formed in a thermoplastic blow molding operation. Base 24 is a self-supporting base formed during bottle manufacture. Such a bottle can contain either a second layer prepared from a parison having a second thermoplastic material formed during parison formation or can have a second layer derived from a liquid coating material. The liquid coating material can be either a parison coating or a bottle coating.

The foregoing discussion illustrates various embodiments of the application under the barrier and trapping properties of the materials of the invention. The following examples and data further exemplify the invention and contain a best mode.

As a model for beverage containers we made films and tested the films for barrier properties. We have found that the cyclodextrin material can be melt blended into thermoplastic materials smoothly resulting in clear extrudable thermoplastic materials with the cyclodextrin materials uniformly distributed throughout the thermoplastic. Further, we have found that the cyclodextrin derivatives can be combined with a broad variety of thermoplastic films. The cyclodextrin materials can be incorporated into the films in a broad range of cyclodextrin concentrations. The cyclodextrin containing thermoplastic materials can be blown into films of varying thickness and can be blown free of melt fracture or other film or sheet variation. We have found in our experimentation that the barrier properties, i.e. reduction in transmission rate of aromatic hydrocarbons, aliphatic hydrocarbons, ethanol and water vapor can be achieved using the cyclodextrin derivative technology. We have also found that the use of cyclodextrin materials improve the surface properties of the film. The surface tension of the film surface and surface electrical properties were also improved. Such a result increases the utility of the films; of the invention in coating, printing, laminating, handling, etc. In initial work we have also found (1) several modified cyclodextrin candidates were found to be compatible with the LLDPE resin and provide good complexation of residual LLDPE volatile contaminants as well as reduce organic permeants diffusing through the film. (2) Unmodified βCD adversely affects transparency, thermal stability, machinability, and barrier properties of the film. Conversely, selected modified βCD (acetylated and trimethylsilyl ether derivatives) have no affect on transparency and thermal stability. The machinability of the extruded plastic material is effected somewhat causing some surface defects, thereby reducing the barrier properties of the film. (3) Films containing a modified βCD composition (1% by weight) reduce aromatic permeants by 35% at 72° F. and 38% at 105° F.; aliphatic permeants were reduced by only 9% at 72° F. These results would improve significantly if worst case shelf-life testing conditions were not used to test the films. (4) Complexation rates were different for aromatic and aliphatic permeants. Films containing modified βCD had better complexation rates for aromatics (gasoline-type compounds) than aliphatic (printing ink-type compounds). Conversely, film coating had significantly better complexation of aliphatic compound than aromatic compounds. (5) βCD containing acrylic coatings were the star performers reducing aliphatic permeants from 46% to 88%, while aromatics were reduced by 29%.

QUALITATIVE PREPARATION

Initially, we produced four experimental test film models. Three of the films contained β-cyclodextrin βCD at loading of 1%, 3% and 5% (wt./wt.) while the fourth was a control film made from the same batch of resin and additives but without βCD. The 5% loaded βCD film was tested for complexation of residual organic in the test film. Even though βCD was found to effectively complex residual organics in the linear low density polyethylene (LLDPE) resin, it was incompatible with the resin and formed βCD particle agglomerations.

We have evaluated nine modified βcyclodextrins and a milled β-cyclodextrin (particle size 5 to 20 microns). The different cyclodextrin modifications were acetylated, octanyl succinate, ethoxyhexyl glycidyl ether, quaternary amine, tertiary amine, carboxymethyl, succinylated, amphoteric and trimethylsilyl ether. Each experimental cyclodextrin (1% loading wt/wt) was mixed with low density polyethylene (LLDPE) using a Littleford mixer and then extruded using a twin screw Brabender extruder.

The nine modified cyclodextrin and milled cyclodextrin LLDPE profiles were examined under an optical microscope at 50× and 200× magnification. The microscopic examination was used to visually check for compatibility between LLDPE resin and cyclodextrin. Of the ten cyclodextrin candidates tested, three (acetylated, octanyl succinate and trimethylsilyl ether) were found visually to be compatible with the LLDPE resin.

Complexed residual film volatiles were measured using cryotrapping procedure to test 5% βCD film sample and three extruded profiles containing 1% (wt/wt) acetylated βCD octanyl succinate βCD and trimethylsilyl ether. The method consists of three separate steps; the first two are carried out simultaneously while the third, an instrumental technique for separating and detecting volatile organic compounds, is conducted after one and two. In the first step, an inert pure, dry gas is used to strip volatiles from the sample. During the gas stripping step, the sample is heated at 120° C. The sample is spiked with a surrogate (benzene-d6) immediately prior to the analysis. Benzene-$d_6$ serves as an internal QC surrogate to correct each set of test data for recovery. The second step concentrates the volatiles removed from the sample by freezing the compounds from the stripping gas in a headspace vial immersed in a liquid nitrogen trap. At the end of the gas-stripping step, an internal standard (toluene-d8) is injected directly into the headspace vial and the vial is capped immediately. Method and system blanks are interspersed with samples and treated in the same manner as samples to monitor contamination. The concentrated organic components are then separated, identified and quantitated by heated headspace high resolution gas chromatography/mass spectrometry (HRGC/MS). The results of the residual volatile analyses are presented in the table below:

TABLE 1

| Sample Identification | % Volatile Complexation as Compared to Control |
| --- | --- |
| 5% βCD Blown Film | 80 |
| 1% Acylated βCD Profile | 47 |
| 1% Octanyl Succinate βCD Profile | 0 |
| 1% Trimethylsilyl ether Profile | 48 |
| 1% βCD Milled Profile | 29 |

In these preliminary screening tests, βCD derivatives were shown to effectively complex trace volatile organics inherent in low density polyethylene resin used to make experimental film. In 5% βCD loaded LLDPE film, approximately 80% of the organic volatiles were complexed. However, all βCD films (1% and 5%) had an off-color (light brown) and off-odor. The color and odor problem is believed to be the result of direct decomposition of the CD or impurity in the CD. Two odor-active compounds (2-furaldehyde and 2-furanmethanol) were identified in the blown film samples.

Of the three modified compatible CD candidates (acetylated, octanyl succinate and trimethylsilyl ether), the acetylated and trimethylsilyl ether CD were shown to effectively complex trace volatile organics inherent in the LLDPE resin. One percent loadings of acetylated and trimethylsilyl ether (TMSE) βCD showed approximately 50% of the residual LPDE organic volatiles were complexed, while the octanyl succinate CD did not complex residual LLDPE resin volatiles. Milled βCD was found to be less effective (28%) than the acetylated and TMSE modified βCD's.

Plastic packaging materials all interact to some degree with the food product they protect. The main mode of interaction of plastic packaging of food is through the migration of organic molecules from the environment through the polymer film into the head space of the package where they are absorbed by the food product. Migration or transfer of organic molecules of the package to the food, during-storage, is effected by environmental conditions such as temperature, storage time, and other environmental factors (e.g., humidity, type of organic molecules and concentration thereof). Migration can have both quality (consumer resistance) and toxicological influence. The objective of packaging film testing is to measure how specific barriers may influence the quality of packaged individual foods. To simulated accelerated shelf-life testing for low-water-activity food products, the testing was conducted at a temperature of 72° F. and 105° F., and a relative humidity of 60%. These temperature and humidity conditions are probably similar to those found in uncontrolled warehouses, in transit, and in storage.

If a polymer is moisture sensitive, the relative humidity can affect the film's performance especially in low-water-activity food products. Because a packaging film during actual end-use conditions will be separating two moisture extremes, relative humidity in the permeation device was controlled on both sides of the film. The environment side, representing the outside of the package, was maintained at 60% relative humidity, and the sample side, representing the inside of a package containing a low-water-activity product, at 0.25.

A combination of permeants was used to measure the function and performance of the CD. A combination was used to be realistic, since gasoline (principally an aromatic hydrocarbon mixture) and printing ink solvents (principally an aliphatic hydrocarbon mixture) are not formed from a single compound but are a mixture of compounds.

The aromatic permeant contained ethanol (20 ppm), toluene (3 ppm), p-xylene (2 ppm), o-xylene (1 ppm), trimethylbenzene (0.5 ppm) and naphthalene (0.5 ppm). The aliphatic permeant, a commercial paint solvent blend containing approximately twenty (20) individual compounds, was 20 ppm.

The permeation test device is described in U.S. Pat. No. 5,603,974, issued Feb. 18, 1997 to Wood et al., which is expressly incorporated by reference herein.

Experimental film performance was measured in the closed-volume permeation device. High-resolution gas chromatograph (HRGC) operated with a flame ionization detector (FID) was used to measure the change in the cumulative penetrant concentration as a function of time. Sample-side (food product side) compound concentrations are calculated from each compound's response factor. Concentrations are reported in parts per million (ppm) on a volume/volume basis. The cumulative penetrant concentration on the sample-side of the film is plotted as a function of time.

We produced four experimental test films. Three of the films contained βCD at loading of 1%, 3% and 5% (wt/wt) while the fourth was a control film made from the same batch of resin and additives but without βCD.

A second experimental technique was also undertaken to determine whether βCD sandwiched between two control films will complex organic vapors permeating the film. The experiment was carried out by lightly dusting βCD between two control film sheets.

The testing showed the control film performed better than βCD loaded films. The permeation test results also demonstrated the higher the βCD loading the poorer the film performed as a barrier. The test results for sandwiching βCD between two control films showed βCD being twice as effective in reducing permeating vapors than the control samples without βCD. This experiment supported that CD does complex permeating organic vapors in the film if the film's barrier qualities are not changed during the manufacturing process making the film a less effective barrier.

The 1% TMSE βCD film was slightly better than the 1% acetylated βCD film (24%-vs-26%) for removing aromatic permeants at 72° F. adding more modified CD appeared to have no improvement.

For aromatic permeants at 105° F., both 1% TMSE βCD and 1% acetylated βCD are approximately 13% more effective removing aromatic permeants than 72° F. The 1% TMSE film was again slightly better than the 1% film (36%-vs-31%) for removing aromatic permeants.

The 1% TMSE film was more effective initially removing aliphatic permeants than the 1% acetylated βCD film at 72° F. But for the duration of the test, 1% TMSE βCD was worse than the control while 1% acetylated βCD removed only 6% of the aliphatic permeants.

We produced two experimental aqueous coating solutions. One solution contained hydroxyethyl βCD (35% by weight) and the other solution contained hydroxypropyl βCD (35 by weight). Both solutions contained 10% of an acrylic emulsion comprising a dispersion of polyacrylic acid having a molecular weight of about 150,000 (Polysciences, Inc.) (15% solids by weight) as a film forming adhesive. These solutions were used to hand-coat test film samples by laminating two LLDPE films together. Two different coating techniques were used. The first technique very slightly stretched two film samples flat, the coating was then applied using a hand roller, and then the films were laminated together while stretched flat. The Rev. 1 samples were not stretched during the lamination process. All coated samples were finally placed in a vacuum laminating press to remove air bubbles between the film sheets. Film coating thicknesses were approximately 0.0005 inches. These CD coated films and hydroxylmethyl cellulose coated control films were subsequently tested.

A reduction in aromatic and aliphatic vapors by the hydroxyethyl βCD coating is greater in the first several hours of exposure to the vapor and then diminishes over the next 20 hours of testing. Higher removal of aliphatic vapors than aromatic vapors was achieved by the hydroxyethyl βCD coating; this is believed to be a function of the difference in their molecular size (i.e., aliphatic compounds are smaller than aromatic compounds). Aliphatic permeants were reduced by 46% as compared to the control over the 20 hour test period. Reduction of aromatic vapors was 29% as compared to the control over the 17 hour test period.

The Rev. 1 coated hydroxyethyl βCD reduced the aliphatic permeants by 87% as compared to the control over the 20 hour test period. It is not known if the method of coating the film was responsible for the additional 41% reduction over the other hydroxyethyl βCD coated film.

The hydroxyethyl βCD coating was slightly better for removing aromatic permeants than the hydroxypropyl βCD coating (29%-vs-20%) at 72° F.

LARGE SCALE FILM EXPERIMENTAL

Preparation of Cyclodextrin Derivatives

EXAMPLE I

An acetylated β-cyclodextrin was obtained that contained 3.4 acetyl groups per cyclodextrin on the primary —OH group.

EXAMPLE II

Trimethyl Silyl Ether of β-cyclodextrin

Into a rotary evaporator equipped with a 4000 milliliter round bottom flask and a nitrogen atmosphere, introduced at a rate of 100 milliliters $N_2$ per minute, was placed three liters of dimethylformamide. Into the dimethylformamide was placed 750 grams of β-cyclodextrin. The β-cyclodextrin was rotated and dissolved in dimethylformamide at 60° C. After dissolution, the flask was removed from the rotary evaporator and the contents were cooled to approximately 18° C. Into the flask, placed on a magnetic stirrer and equipped with a stir bar, was added 295 milliliters of hexamethyldisilylazine (HMDS-Pierce Chemical No. 84769), followed by the careful addition of 97 milliliters of trimethylchlorosilane (TMCS -Pierce Chemical No. 88531). The careful addition was achieved by a careful dropwise addition of an initial charge of 20 milliliters and after reaction subsides the careful dropwise addition of a subsequent 20 milliliter portions, etc. until addition is complete. After the addition of the TMCS was complete, and after reaction subsides, the flask and its contents were placed on the rotary evaporator, heated to 60° C. while maintaining an inert nitrogen atmosphere flow of 100 milliliters of $N_2$ per minute through the rotary evaporator. The reaction was continued for four hours followed by removal of solvent, leaving 308 grams of dry material. The material was removed from the flask by filtering, washing the filtrate with deionized water to remove the silylation products, vacuum oven drying (75° C. at 0.3 inches of Hg) and stored as a powdered material and maintained for subsequent compounding with a thermoplastic material. Subsequent spectrographic inspection of the material showed the β-cyclodextrin to contain approximately 1.7 trimethylsilylether substituent per β-cyclodextrin molecule. The substitution appeared to be commonly on a primary 6-carbon atom.

EXAMPLE III

An hydroxypropyl β-cyclodextrin was obtained with 1.5 hydroxypropyl groups per molecule on the primary 6—OH group of the βCD.

EXAMPLE IV

An hydroxyethyl β-cyclodextrin was obtained with 1.5 hydroxyethyl groups per molecule on the primary 6—OH group of the βCD.

Preparation of Films

We prepared a series of films using a linear low density polyethylene resin as a beverage container model. βCD and derivatized βCD such as the acetylated or the trimethylsilyl derivative of a β-cyclodextrin were used. The polymer particles were dry blended with the powdered β-cyclodextrin and β-cyclodextrin derivative material, a fluoropolymer lubricant (3M) and the antioxidant until uniform in the dry blend. The dry blend material was mixed and extruded in a pellet form in a Haake System 90, ¾" conical extruder. The resulting pellets were collected for film preparation.

Table IA displays typical pelletizing extruder conditions. The films were blown in an extruder as described in U.S. Pat. No. 5,603,974, issued Feb. 18, 1997 to Wood et al., which is expressly incorporated herein. The film is manufactured.

TABLE IA 0.5% TMSE Pelletizing 1-19-94

| Run Time | 0 min 13 sec. | Torque Tot. Torque | 4866 meter-gram 0.0 mkg-min | Rotor Aux. | 198 rpm 0% | |
|---|---|---|---|---|---|---|
| Channels | 1 | 2 | 3 | 4 | 5 | 6 |
| Melt Temp | 37 | 41 | 41 | 41 | 41 | | °C. |
| Set Temp | 150 | 160 | 160 | 170 | 0 | 0 | °C. |
| Deviation | 0 | 0 | 0 | 0 | 0 | 0 | °C. |
| Cooling | Yes | Yes | Yes | Yes | | | |
| Pressure | 0 | 0 | 2739 | 0 | 0 | | psi |

TABLE IB

Extruded Films (Exxon LL3201)
Made With Low Density Polyethylene

| Roll No. | Sample ID | Fluoropolymer Additive[1] | Extruder Temp. Zone 3 (F.) | Melt Temp (F.) | Die Temp. Zone 3 (F.) | Lbs./Hr | RPM | Die Gap | Comments |
|---|---|---|---|---|---|---|---|---|---|
| 1 | Control | 500 ppm | 428 | 406 | 406 | 30.1 | 50 | 24 | |
| 2 | 1% Ex. I | 1000 ppm | 441 | 415 | 420 | 29.7 | 50 | 35 | |
| 3 | 1% Ex. I | 1000 ppm | 441 | 416 | 420 | 28.5 | 50 | 35 | |
| 4 | 1% Ex. I | 500 ppm | 441 | 415 | 420 | 29.9 | 50 | 35 | |
| 5 | 1% Ex. I | 500 ppm | 418 | 405 | 414 | 29.9 | 50 | 35 | |
| 6 | 1% Ex. I | 500 ppm | 421 | 397 | 414 | 29.0 | 50 | 35 | |
| 7 | 0.5% Ex. I | 500 ppm | 421 | 403 | 415 | 29.0 | 50 | 35 | |
| 8 | 2% Ex. I | 500 ppm | 421 | 404 | 415 | 27.7 | 50 | 35 | Very slight melt fracture |
| 9 | 1% Ex. II | 500 ppm | 421 | 406 | 415 | 28.3 | 50 | 35 | Particles in film. |
| 10 | 1% Ex. II | 500 ppm | 426 | 410 | 415 | 26.7 | 50 | 35 | Particles in film. |
| 11 | 1% Ex. II | 500 ppm | 432 | 415 | 414 | 29.0 | 50 | 35 | Particles in film. Very slight yellowing to film. |
| 12 | 1% Ex. II | 500 ppm | 431 | 414 | 415 | 21.5 | 39 | 35 | Particles in film. |
| 13 | 0.5% Ex. II | 500 ppm | 431 | 415 | 415 | 27.7 | 50 | 35 | Particles in film. |
| 14 | 0.5% Ex. II | 500 ppm | 425 | 410 | 415 | 28.9 | 50 | 35 | Particles in film. |
| 15 | 2% Ex. II | 500 ppm | 410 | 414 | 415 | 20.2 | 38 | 35 | Particles in film. Very slight yellowing to film. |
| 16 | 2% Ex. II | 500 ppm | 422 | 415 | 415 | 20.5 | 38 | 35 | Particles in film. Very slight yellowing to film. |
| 17 | 2% Ex. II | 500 ppm | 422 | 416 | 415 | 20.5 | 38 | 35 | Particles in film. Very slight yellowing in film. |

[1]Also contains 500 ppm Irganox 1010 antioxidant and 1000 ppm IrgaFos 168.

TABLE II

| | Test Conditions | | | |
|---|---|---|---|---|
| Roll Sample ID Number | Temp. (F.) | Sample Side | Environ. Side | Permeant[234] |
| Roll #2 | 72 | Rm % RH | Rm % RH | Aromatic/Alcohol |
| Roll #3 | | | | |
| Roll #5 | | | | |
| Roll #6 | | | | |
| Roll #5 | 72 | Rm % RH | Rm % RH | Aromatic/Alcohol |
| Roll #8 | | | | |
| Roll #7 | 72 | 0.25 Aw | 60% RH | Aromatic/Alcohol |
| Roll #5 | | | | |
| Roll #8 | | | | |
| Roll #7 | 72 | .60 Aw | 30% RH | Aromatic/Alcohol |
| Roll #5 | | | | |
| Roll #8 | | | | |
| Roll #2 | 105 | Rm % RH | Rm % RH | Aromatic/Alcohol |
| Roll #3 | | | | |
| Roll #4 | | | | |
| Roll #5 | | | | |
| Roll #6 | | | | |
| Roll #8 | | | | |
| Roll #12 | | | | |
| Roll #7 | 105 | 0.25 Aw | 15% RH | Aromatic/Alcohol |
| Roll #5 | | | | |
| Roll #8 | | | | |
| Roll #13 | 72 | Rm % RH | Rm % RH | Aromatic/Alcohol |
| Roll #14 | | | | |
| Roll #9 | | | | |
| Roll #9 | | | | |
| Roll #11 | | | | |
| Roll #12 | | | | |
| Roll #15 | | | | |
| Roll #16 | | | | |
| Roll #17 | | | | |
| Roll #14 | 105 | Rm % RH | Rm % RH | Aromatic/Alcohol |
| Roll #15 | | | | |
| 10% Ex. III in PVdC | 72 | 0.25 Aw | 60% RH | Aromatic/Alcohol |
| 20% Ex. III in PVdC | | | | |

TABLE II-continued

Test Conditions

| Roll Sample ID Number | Temp. (F.) | Sample Side | Environ. Side | Permeant[234] |
|---|---|---|---|---|
| 5% Ex. III/ Acrylic | 72 | Rm % RH | Rm % RH | Aromatic/Alcohol |
| 10% Ex. III/ Acrylic |  |  |  |  |
| Roll #7 | 72 | Rm % RH | Rm % RH | Naphtha |
| Roll #5 |  |  |  |  |
| Roll #8 |  |  |  |  |
| Roll #12 | 72 | Rm % RH | Rm % RH | Naphtha |
| Roll #15 |  |  |  |  |

[2] 7 ppm aromatic plus 20 ppm ETOH.
[3] 7 ppm aromatic plus 20 ppm ETOH.
[4] 40 ppm Naphtha The results of the testing show that the inclusion of a compatible cyclodextrin material in the thermoplastic films of the invention substantially improves the barrier properties by reducing transmission rate of a variety of permeants. The data showing the improvement in transmission rate is shown below in the following data tables.

Comparison of Transmission Rates in
Modified β-Cyclodextrin — LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volatiles % Improvement Over Control |
|---|---|---|---|---|
| Control Film | 3.35E−04 | 0% | 3.79E−04 | 0% |
| 1.0% CS-001 (Roll #2) | 3.18E−04 | 5% | 3.61E−04 | 5% |
| 1.0% CS-001 (Roll #3) | 2.01E−04 | 40% | 2.55E−04 | 33% |
| 1.0% CS-001 (Roll #5) | 2.67E−04 | 20% | 3.31E−04 | 13% |
| 1.0% CS-001 (Roll #6) | 3.51E−04 | −5% | 3.82E−04 | −1% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E−03 | 0% |
| 0.5% CS-001 (Roll #7) | 7.67E−03 | 2% |
| 1% CS-001 (Roll #5) | 7.37E−03 | 6% |
| 2% CS-001 (Roll #8) | 6.53E−03 | 16% |

$$* \frac{gm \cdot 0.001 \text{ in.}}{100 \text{ in}^2 \cdot 24 \text{ hrs.}}$$

Comparison of Transmission Rates in
Modified β-Cyclodextrin — LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | Tot. Volatiles % Improvement Over Control |
|---|---|---|---|---|
| Control Film (Roll #1) | 5.16E−04 | 0% | 5.63E−04 | 0% |
| 1.0% CS-001 (Roll #5) | 4.01E−04 | 22% | 5.17E−04 | 8% |
| 2.0% CS-001 (Roll #8) | 2.91E−04 | 44% | 3.08E−04 | 45% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 7.81E−03 | 0% |
| 0.5% CS-001 (Roll #7) | 7.67E−03 | 2% |
| 1% CS-001 (Roll #5) | 7.37E−03 | 6% |
| 2% CS-001 (Roll #8) | 6.53E−03 | 16% |

$$* \frac{gm \cdot 0.001 \text{ in.}}{100 \text{ in}^2 \cdot 24 \text{ hrs.}}$$

Comparison of Transmission Rates in
Modified β-Cyclodextrin — LLDPE Films
Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 3.76E−04 | 0% | 3.75E−04 | 0% |
| 0.5% CS-001 (Roll #7) | 2.42E−04 | 36% | 2.41E−04 | 36% |
| 1% CS-001 (Roll #5) | 3.39E−04 | 10% | 3.38E−04 | 10% |
| 2% CS-001 (Roll #8) | 2.48E−04 | 34% | 2.47E−04 | 34% |

Comparison of Transmission Rates in
Modified β-Cyclodextrin - LPDE Films
Temperature 105° F.
Sample Side:   Room % RH
Environment:   Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 1.03E-03 | 0% | 1.13E-03 | 0% |
| 1% CS-001 (Roll #2) | 5.49E-04 | 47% | 5.79E-04 | 49% |
| 1% CS-001 (Roll #3) | 4.74E-04 | 54% | 5.00E-04 | 56% |
| 1% CS-001 (Roll #4) | 6.41E-04 | 38% | 6.83E-04 | 40% |
| 1% CS-001 (Roll #5) | 5.22E-04 | 49% | 5.54E-04 | 51% |
| 1% CS-001 (Roll #6) | 4.13E-04 | 60% | 4.39E-04 | 61% |
| 2% CS-001 (Roll #8) | 5.95E-04 | 42% | 6.18E-04 | 45% |
| 1% TMSE (Roll #12) | 8.32E-04 | 19% | 8.93E-04 | 21% |

* $\dfrac{gm \cdot 0.001\ in.}{100\ in^2 \cdot 24\ hrs.}$

Comparison of Transmission Rates in
Modified β-Cyclodextrin — LPDE Films
Temperature 105° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 4.34E-04 | 0% | 4.67E-04 | 0% |
| 0.5% CS-001 (Roll #7) | 4.03E-04 | 7% | 4.41E-04 | 6% |
| 1.0% CS-001 | 5.00E-04 | -15% | 5.33E-04 | -14% |
| 2.0% CS-001 (Roll #5) (Roll #8) | 3.96E-04 | 9% | 3.94E-04 | 16% |

Comparison of Transmission Rates in
Modified β-Cyclodextrin - LPDE Films
Temperature 72° F.
Sample Side:   Room % RH
Environment:   Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film | 3.09E-04 | 0% | 3.45E-04 | 0% |
| 0.5% TMSE (Roll #13) | 2.50E-04 | 19% | 2.96E-04 | 14% |
| 0.5% TMSE (Roll #14) | 2.37E-04 | 23% | 2.67E-04 | 33% |
| 1% TMSE (Roll #9) | 2.67E-04 | 14% | 3.05E-04 | 12% |
| 1% TMSE (Roll #10) | 4.85E-04 | -57% | 5.27E-04 | -53% |
| 1% TMSE (Roll #11) | 2.58E-04 | 17% | 2.92E-04 | 15% |

-continued

Comparison of Transmission Rates in
Modified β-Cyclodextrin - LPDE Films
Temperature 72° F.
Sample Side:   Room % RH
Environment:   Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| 1% TMSE (Roll #12) | 2.15E-04 | 31% | 2.55E-04 | 26% |
| 2% TMSE (Roll #15) | 2.54E-04 | 18% | 3.04E-04 | 12% |
| 2% TMSE (Roll #16) | 2.79E-04 | 10% | 3.21E-04 | 7% |
| 2% TMSE (Roll #17) | 2.81E-04 | 9% | 3.24E-04 | 6% |

* $\dfrac{\text{gm} \cdot 0.001 \text{ in.}}{100 \text{ in}^2 \cdot 24 \text{ hrs.}}$ Comparison of Transmission Rates in
Modified β-Cyclodextrin — LPDE Films
Temperature 72° F.
Sample Side: Room % RH
Environment: Room % RH

| Sample Identification | Aromatic Transmission Rate* | Naphtha % Improvement Over Control |
|---|---|---|
| Control Film (Roll #1) | 9.43E-03 | 0% |
| 1% TMSE (Roll #12) | 1.16E-02 | -23% |
| 2% TMSE (Roll #15) | 1.56E-02 | -65% |

Comparison of Transmission Rates in
Modified β-Cyclodextrin — LPDE Films
Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| PVdC Control | 6.81E-05 | 0% | 1.05E-04 | 0% |
| PVdC w/ 10% HP B-CyD | 1.45E-05 | 79% | 2.39E-05 | 77% |

Comparison of Transmission Rates in
Modified β-Cyclodextrin - LPDE Films
Temperature 72° F.
Sample Side:   Room % RH
Environment:   Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Film (Roll #1) | 8.36E-04 | 0% | 9.05E-04 | 0% |
| 0.5% TMSE (Roll #14) | 6.77E-04 | 19% | 7.25E-04 | 20% |
| 2% TMSE (Roll #15) | 6.36E-04 | 24% | 6.81E-04 | 25% |

* $\dfrac{\text{gm} \cdot 0.001 \text{ in.}}{100 \text{ in}^2 \cdot 24 \text{ hrs.}}$ -continued Comparison of Transmission Rates in
Modified β-Cyclodextrin — LPDE Films
Temperature 72° F.
Sample Side: 0.25 Aw
Environment: 60% RH

| Sample Identification | Aromatic Transmission Rate* | Aromatics % Improvement Over Control | Total Volatiles Transmission Rate* | T. Volatiles % Improvement Over Control |
|---|---|---|---|---|
| PVdC w/ 20% HP B-CyD | 9.71E–05 | –42% | 1.12E–04 | –7% |

Comparison of Transmission Rates in
Modified β-Cyclodextrin - LPDE Films
Temperature 72° F.
Sample Side: Room % RH
Environment: Room % RH

| Sample Identification | Aromatic Transmission Rate* | Aromatics % Improvement Over Control | Total Volatiles Transmission Rate* | T. Volatiles % Improvement Over Control |
|---|---|---|---|---|
| Control Acrylic | 2.07E-06 | 0% | 2.10E-05 | 0% |
| 5% HP B-CyD/ Acrylic | 1.5E0-06 | 27% | 2.07E-05 | 1% |
| 10% HP B-CyD/ Acrylic | 4.13E-06 | –100% | 4.30E-05 | –105% |

* $\dfrac{\text{gm} \cdot 0.001 \text{ in.}}{100 \text{ in}^2 \cdot 24 \text{ hrs.}}$ We prepared a series of aqueous coatings containing hydroxypropyl βCD. These coatings can be used to coat the interior or exterior of a bottle. One of the coatings was prepared from a 10% acrylic emulsion (a polyacrylic acid polymer having a molecular weight of about 150,000 purchased from Polysciences, Inc.). The 10% acrylic emulsion contained hydroxypropyl βCD at a 5% and 10% by weight loading. These solutions were used to hand-coat test film samples by laminating two films. The coatings were applied to linear low density polyethylene film sheet containing 0.5% acetylated βCD (Roll No. 7) and to a second film sheet containing 2% acetylated βCD (Roll No. 8) using a hand roller and then laminating the films. The films were not stretched during lamination. All coated samples were placed in a vacuum laminating press to remove air bubbles between the film sheets. The acrylic coating thickness was about 0.0002 inch. An acrylic coated control was prepared in an identical manner containing no hydroxypropyl βCD. The multilayer structure was tested with the 0.5% acetylated βCD film facing the environmental flask side of the test cell.

A second coating was prepared from a vinylidene chloride latex (PVDC, 60 wt-% solids) purchased from Dagax Laboratories, Inc. The PVDC latex coating was prepared with two levels of hydroxypropyl βCD—10% and 20% by weight of the derivatized cyclodextrin. These solutions were used to hand-coat linear low density polyethylene test film samples by laminating the two films together. The coatings were applied to two control film sheets (rolled into one) using a hand roller and laminated together. The films were not stretched during lamination process. All coated samples were placed in a vacuum laminating press to remove air bubbles between the film sheets. The PVDC coating thickness was approximately 0.0004 inch. A PVDC coated control was prepared in an identical manner but without hydroxypropyl βCD.

The data following the preparatory examples showing improvement in transmission rate was obtained using the following general test method.

Method Summary

This method involves experimental techniques designed to measure the permeability of selected organic molecules through food packaging films, using a static concentration gradient. The test methodology simulates accelerated shelf-life testing conditions by implementing various storage humidities, product water activities and temperature conditions and using organic molecule concentrations found in previously tested food products to simulate outside-the-package organic vapors in the permeation test cell. This procedure allows for the determination of the following compounds: ethanol, toluene, p-xylene, o-xylene, 1,2,4-trimethyl benzene, naphthalene, naphtha solvent blend, etc.

| Test Compounds | Threshold Odor Conc. ul/L ppm | Environmental Cell Conc. ul/L ppm |
|---|---|---|
| Ethanol | 5–5000 | 20 |
| Toluene | 0.10–20 | 3 |
| p-Xylene | 0.5 | 2 |
| o-Xylene | 0.03–12 | 1 |
| 1,2,3-Trimethyl Benzene | NA | 0.5 |
| Naphthalene | 0.001–0.03 | 0.5 |
| Naphtha Solvent Blend | NA | 40 |

Table 1. Permeant Test Compounds

In a typical permeation experiment, three steps are involved. They are (a) the instrument sensitivity calibration, (b) film testing to measure transmission and diffusion rates, and (c) the quality control of the permeation experiment.

Film samples are tested in a closed-volume permeation device. High-resolution gas chromatograph (HRGC) operated with a flame ionization detector (FID) is used to measure the change in the cumulative penetrant concentration as a function of time.

Sample-side and environment-side test compound concentrations are calculated from each compound's response factor or calibration curve. Concentrations are then volume-corrected for each specific set of permeation cells if permeant mass is desired.

The cumulative penetrant concentration is plotted as a function of time on both the upstream (environment) and downstream (sample) side of the film. The diffusion rate and transmission rate of the permeant are calculated from the permeation curve data.

1.0 Equipment and Reagents 2.1 Equipment

Gas chromatograph (HP 5880) equipped with flame ionization detector, a six-port heated sampling valve with 1 ml sampling loop and data integrator J&W capillary column. DB-5, 30M×0.250 mm ID, 1.0 umdf.

Glass permeation test cells as previously referenced.

Permeation cell clamping rings (2).

Permeation cell aluminum seal rings (2).

Natural Rubber Septa. 8 mm OD standard-wall or 9 mm OD (Aldrich Chemical Company, Milwaukee, Wis.).

Assorted laboratory glass ware and syringes.

Assorted laboratory supplies.

2.2 Reagents

Reagent water. Water in which interferences are not observed at the MDL of the chemical analytes of interest. A water purification system is used to generate reagent water which has been boiled to 80% volume, capped, and allowed to cool to room temperature before use.

Stock Ethanol/Aromatic Standard solution. Ethanol (0.6030 gram), toluene (0.1722 gram), p-xylene (0.1327 gram), o-xylene (0.0666 gram), trimethylbenzene (0.0375 gram) and naphthalene (0.0400 gram) package in 1 ml sealed glass ampules. Naphtha blends standard is a commercial paint solvent blend containing approximately twenty (20) individual aliphatic hydrocarbon compounds obtained from Sunnyside Corporation, Consumer Products Division, Wheeling, Ill.

Triton X-100. Nonylphenol nonionic surface active agent (Rohm and Hass).

2.0 Standards Preparation 2.2 Permeation Working Standard

A stock permeant test standard solution is used. These standards are prepared by weight from neat certified reference compounds, actual weight and weight percent are shown.

The working ethanol/aromatic standard is prepared by injecting 250 ul of the stock standard solution into 100 ml of reagent water containing 0.1 gram of surfactant (Triton X-100). It is important that the Triton X-100 is completely dissolved in the reagent water prior to adding the permeant stock standard. This will insure dispersing the test compounds in the water. In addition, the working standard should be mixed thoroughly each time an aliquot is dispensed. It is advisable to transfer the working standard to crimp-top vials with no headspace to minimize losses due to the large headspace in the volumetric flask used to prepare the standard.

A working naphtha blend standard is prepared by injecting 800 $\mu$L of the "neat" naphtha solvent blend into 100 milliliters of reagent water containing 0.2 gram of surfactant (Triton X-100).

An opened stock standard solution should be transferred from the glass snap-cap vial to a crimp-top vial for short-term storage. The vials may be stored in an explosion-proof refrigerator or freezer.

2.1 Calibration Standards

Calibration standards are prepared at a minimum of three concentration levels by adding volumes of the working standard to a volumetric flask and diluting to volume with reagent water. One of the standards is prepared at a concentration near, but above, the method detection limit. The other concentrations correspond to the expected range of concentrations found in the environment and sample side cells.

3.0 Sample Preparation 3.1 Film Sample Preparation

The permeation test cell as previously referenced, also known as an environment flask, and sample flask are washed before use in soapy water, thoroughly rinsed with deionized water, and oven-dried. Following cleaning, each flask is fitted with a rubber septum.

The film test specimen is cut to the inside diameter of the aluminum seal ring using a template. The film test specimen diameter is important to prevent diffusion losses along the cut edge circumference. The film sample, aluminum seals, and flasks are assembled as shown in FIG. 3, but the clamping ring nuts are not tightened.

The test cell is prepared as described by U.S. Pat. No. 5,603,974, as previously referenced.

The sample side is injected with 2 $\mu$L of water per 300 ml flask volume. Since the sample flasks vary in volume, the water is varied to correspond to the volume variations. The 2 $\mu$L of water in the 300 ml flask volume is comparable to a 0.25 water activity product at 72° F. Next, 40 $\mu$L, the permeation ethanol/aromatic working standard or 40 $\mu$L of the naphtha blend working standard prepared according to section 2.2, is injected into the environmental flask. Either of these working standards will produce a 60% relative humidity at 72° F. with a permeant concentration (parts per million-volume/volume) in the 1200 ml volume flask indicated in Table I. Other humidities or permeant concentrations may be employed in the test method by using psychrometric chart to determine humidity and using the gas loss to calculate permeant concentration. The time is recorded and the permeation cell placed into a thermostatically controlled oven. Samples may be staggered to accommodate GC run time. Three identical permeation devices are prepared. Triplicate analyses are used for QC purposes.

At the end of each time interval, a sample from the group is removed from the oven. The environmental flask is analyzed first, using a heated six-port sampling valve fitted with a 1 ml loop. The loop is flushed with a 1 ml volume of the environment-side or sample-side air. The loop is injected onto the capillary column. The GC/FID system is started manually following the injection. Up to eight 1 ml sample injections may be taken from the sample and environment side of a single permeation experiment.

Sample side and environment side test compound concentrations are calculated from each compound's alibration curve or response factor (equation 1 or 3). concentrations are then volume-corrected for each specific set of permeation flasks if permeant mass is desired.

4.0 Sample Analysis 4.1 Instrument Parameters

Standards and samples are analyzed by gas chromatography using the following method parameters:

Column: J&W column, DB-5, 30 M, 0.25 mm ID, 1 umdf

Carrier: Hydrogen

Split Vent: 9.4 ml/min

Injection Port Temp: 105° C.

Flame Detector Temp: 200° C.

Oven Temp 1: 75° C.

Program Rate 1: 15° C.

Oven Temp 2: 125° C.

Rate 2: 20° C.

Final Oven Temp: 200° C.

Final Hold Time: 2 Min

The six-port sampling valve temperature is set to 105° C.

4.2 Calibration

A three point calibration is prepared using standards in the range of the following test compounds:

| Test Compounds | Calibration Curve Range ppm (µL) |
|---|---|
| Ethanol | 2–20 |
| Toluene | 0.3–3 |
| p-Xylene | 0.2–2 |
| o-Xylene | 0.1–1 |
| 1,2,4-Trimethyl Benzene | 0.05–0.5 |
| Naphthalene | 0.05–0.5 |
| Naphtha Solvent Blend | 4.0–40 |

To prepare a calibration standard, add an appropriate volume of the working standard solution to an aliquot of reagent water in a volumetric flask.

4.2.1 Secondary Dilutions of Working Standard for Calibration Curve 5 to 1 dilution: Place 5 ml of working standard into a 25-ml volumetric flask, stopper, then mix by inverting flask.

2.5 to 1 dilution: Place 10 ml of working standard into a 25-ml volumetric flask, stopper, then mix by inverting flask.

Analyze each calibration standard and tabulate compound peak area response versus the concentration of the test compound in the environment side cell. The results are used to prepare a calibration curve for each compound. The naphtha solvent blend is a commercial paint solvent containing approximately twenty (20) individual aliphatic hydrocarbon compounds. The response versus concentration is determined by totaling the area under each of the twenty individual peaks. Method of least squares is used to fit a straight line to the calibration curve. The slope of each test compound's calibration curve is then calculated for determining the unknown concentration. The average response factor may be used in place of the calibration curve.

The working calibration curve or response factor must be verified on each working day by measurement of one or more calibration standards. If the response of any compound varies more than 20%, the test must be repeated using a fresh calibration standard. If the results still do not agree, generate a new calibration curve.

4.3 Analysis of Calibration Curve and Method Detection Level Samples

Recommended chromatographic conditions are summarized above.

Calibrate the system daily as described above.

Check and adjust split vent rate and check rate with soap film flow meter.

To generate accurate data, samples, calibration standards and method detection level samples must be analyzed under identical conditions.

Calibration standards and method detection samples are prepared in the environment flask only. This is accomplished by using a ½ inch plastic disk and aluminum sheet disk the diameter of the environment flange in place of the-sample flask. A single sealing ring is placed onto the environmental glass flange followed by an aluminum sheet, and then the plastic disk.

The environment flask is flushed with dry compressed air to remove humidity in the sample and environment flask. This is done by puncturing the environment septa with a needle and tubing assembly which permits a controlled flow of dry air through the flask. The clamp rings are loosely fitted to the flask to eliminate pressure buildup. After flushing both flasks for approximately 10 minutes, the needle is removed and the clamp rings tightened, sealing the aluminum sheet against the seal ring.

Next, 40 µl of the permeation ethanol/aromatic working standard or secondary dilutions of the working standard is injected into the environment flask. Alternatively, 40 µL of the naphtha solvent blend or secondary dilutions of the working standard is injected into the environmental flask. The time is recorded and the flask is placed into a thermostatically controlled oven.

At the end of 30 minutes, the environment flask is removed from the oven. The environmental flask is analyzed using a heated six-port sampling valve fitted with a 1 ml loop. The loop is flushed with a 1 ml volume of the environment-side or sample-side air. The loop is injected onto the capillary column. The GC/FID system is started manually following the injection.

4.4 Calculation of Results 4.4.1 Test Compound Response Factor

Sample-side and environment-side test compound concentrations are calculated for each compound's calibration curve slope or response factor (RF). Concentrations are then volume-corrected for each specific set of permeation cells if permeant mass is desired.

$$\text{Concentration of Compound in ppm} = \frac{\text{Peak Area}}{\text{Calibration Curve Slope}} \quad (1)$$

$$\text{Compound Specific } RF = \frac{\text{Concentration of Compound in ppm}}{\text{Peak Area}} \quad (2)$$

$$\text{Concentration of Compound in ppm} = \text{Peak Area} \times RF \quad (3)$$

The cumulative penetrant mass is plotted as a function of time on both the upstream (environment) and downstream (sample) side of the film. The diffusion rate and transmission rate of the permeant area calculated from the transmission curve data.

4.4.2 Transmission Rate

When a permeant does not interact with the polymer, the permeability coefficient, P, is usually characteristic for the permeant-polymer system. This is the case with the permeation of many gases, such as hydrogen, nitrogen, oxygen, and carbon dioxide, through many polymers. If a permeant interacts with polymer molecules, as is the case with the permeant test compounds used in this method, P is no longer constant and may depend on the pressure, film thickness, and other conditions. In such cases, a single value of P does not represent the characteristic permeability of the polymer membrane and it is necessary to know the dependency of P on all possible variables in order to obtain the complete profile of the permeability of the polymer. In these cases, the transmission rate, Q, is often used for practical purposes, when the saturated vapor pressure of the permeant at a specified temperature is applied across the film. Permeability of films to water and organic compounds is often expressed this way.

$$P = \frac{(\text{Amount of Permeant})(\text{Film Thickness})}{(\text{Area})(\text{Time})(\text{Pressure-drop Across the Film})} \quad (4)$$

$$Q = \frac{(\text{Amount of Permeant})(\text{Film Thickness})}{(\text{Area})(\text{Time})} \quad (5)$$

In this application, Q is represented in units of $$\frac{gm - 0.001 \text{ inches}}{100 \text{ in}^2 - \text{day}}.$$

One of the major variables in determining the permeation coefficient is the pressure drop across the film. Since the transmission rate Q includes neither pressure nor concentration of the permeant in its dimensions, it is necessary to know either vapor pressure or the concentration of permeant under the conditions of the measurement in order to correlate Q to P.

The pressure-drop across the film from environment side to sample side is principally due to water vapor pressure. The water concentration or humidity does not remain constant and is not measured during the time intervals the organic compounds are analyzed, and therefore the pressure across the membrane is not determined.

The above examples of thermoplastic films containing a variety of compatible cyclodextrin derivatives shows that the invention can be embodied in a variety of different thermoplastic films. Further, a variety of different compatible derivatized cyclodextrin materials can be used in the invention. Lastly, the films can be manufactured using a variety of film manufacturing techniques including extrusion and aqueous dispersion coating to produce useful barriers.

Migration from Food and Beverage Packaging Materials

The migration of trace amounts of reaction and degradation byproducts, additives, oligomers and monomers from food and beverage packaging can affect consumer acceptance, product quality and regulatory approval of candidate packaging materials. Tests were conducted to measure the transfer of these substances from packaging films with and without acetylated cyclodextrin using a method from The Center for Food Safety and applied Nutrition of the U.S. Food and Drug Administration (FDA). The method simulates the expected migration of these substances in a packaging film to a particular food type, but the packaging test material is subjected to accelerated testing which simulates migration occurring to real food under normal conditions of packaging and storage.

We produced six experimental high density polyethylene (HDPE) test films. One of the films contained 0.5% (wt/wt) acetylated α cyclodextrin, two contained a acetylated β cyclodextrin at 0.5% and 1.0% loading levels, and two contained a mixture of acetylated α and β cyclodextrin at 0.5% and 1.0% loading levels. The sixth film was a control made from the same batch of HDPE (DOW 640) and additives (Dynamar FX-9613 processing additive; Irgafos 168 and Irganox 1076 antioxidants) but without cyclodextrin. The films were fabricated by blown film extrusion and had a normal thickness of 2 mil.

Migration testing was conducted according to FDA guidelines for food-simulating liquids. The migration cells were for single sided flexible film and conform to ASTM F34-92. The food simulating liquid was 8% ethanol in deionized water and test temperature 40° C.

The food-simulating liquid (FSL) was withdrawn from the extraction cell after seven days. The FSL was reduced in volume, exchanged with methylene chloride and then analyzed by gas chromatography using flame ionization detection. The gas chromatograms of the six test film FSL extracts are provided in the attached figures. The peaks indicated in the chromatograms are migrants that diffused from the HDPE film into the FSL.

The reduction in the migrant amount was determined quantitatively by comparison of the gas chromatographic total peak areas from 4 minutes to 30 minutes. Film samples containing acetylated cyclodextrin were compared to the control film made from the same HDPE resin and additives but without cyclodextrin. The percent reduction of extractable migrants in the 8% ethanol FSL was determined using the following equation:

$$\% \text{ Reduction in Extractables} = \frac{(\text{Control Film Total Peak Area} - \text{Sample Film Total Peak Area})}{\text{Control Film Total Peak Area}}$$

We were interested in the extent of migration of trace amounts of reaction and degradation byproducts, additives and oligomers in films whose resin contained acetylated cyclodextrin by comparing their gas chromatographic results with film whose resin did not contain acetylated cyclodextrin. These results are provided in Table 1.

GC/FID Analysis Results of Single Sided HDPE Film Extractions*
8% Ethanol in Water Extraction Seven Days at 40° C.

| Sample Film Identification | Cyclodextrin Loading Level in HDPE Film % by Wt. | Extractable Organic Components Expressed as Total GC Peak Areas | Reduction in Extractable Components Expressed as a % of Control Film |
|---|---|---|---|
| Control HDPE Film | NA | 20,720 | NA |
| Acetylated α Cyclodextrin | 0.5% | 9,592 | 54% |
| Acetylated β Cyclodextrin | 0.5% | 869 | 96% |
| Acetylated β Cyclodextrin | 1.0% | 1,651 | 92% |
| Acetylated α and Acetylated β Cyclodextrin | 0.25% ea. | 3,473 | 83% |
| Acetylated α and Acetylated β Cyclodextrin | 0.5% ea. | 16,125 | 22% |

*ASTM Designation: F34-92 for Standard Practice for Construction of Test Cell for Liquid Extraction of Flexible Barrier Materials

Simulated Volatiles Migration from Food and Beverage Packaging Pellets

Food that comes into direct contact with polymeric packaging materials may result in the transfer or migration of volatiles into the stored food product. Though the package materials are approved for direct food contact, they can impart flavors to the food. Volatiles can become incorporated into the pellets during the manufacturing process. When these pellets are converted to film, the flavor of the film can be affected by the residual volatiles.

We compounded four experimental polypropylene (Montel 8623) pellets. Three of the compounded pellets contained acetylated α cyclodextrin, acetylated β cyclodextrin, and a 50%/50% mixture of acetylated a and β cyclodextrin each at a loading level of 0.75% (wt/wt). The fourth was a control pellet made from the same batch of polypropylene resin and additives (Dynamar FX-9613 processing additive; Irgafos 168 and Irganox 1076 antioxidants) but without cyclodextrin.

The method consists of three separate steps; the first two are carried out simultaneously while the third, an instrumental technique for separating and detecting volatile organic compounds, is conducted after one and two. In the first step, an inert pure, dry gas is used to strip volatiles from the sample. During the gas stripping step, the sample is heated at 120° C. The sample is spiked with a surrogate (benzene-d6) immediately prior to the analysis. Benzene-d6 serves as an internal ZC surrogate to correct each set of test data for recovery. The second step concentrates the volatiles removed from the sample by freezing the compounds from the stripping gas in a headspace vial immersed in a liquid nitrogen trap. At the end of the gas-stripping step, an internal standard (toluene-d8) is injected directly into the headspace vial and the vial is capped immediately. Method and system blanks are interspersed with samples and treated in the same manner as samples to monitor contamination. The concentrated organic components are then separated, identified and quantitated by heated headspace high resolution gas chromatography-mass spectrometry (HRGC/MS). The results of the residual volatile analysis are presented in Table 1. The GC/MS total ion chromatograms are provided in the Figures.

Headspace GC/MS Analysis Results of Extruded Polypropylene Pellets
Pellets Heated to 12° C. for 45 Minutes

| Sample Pellet Identification | Cyclodextrin Loading Level in PP Pellets % by Wt. | Mobile Volatile Organic Components Expressed as Total GC Peak Areas | Reduction in Mobile Volatile Organic Components in Acetylated CD Pellets Expressed as a % of Control Pellets |
|---|---|---|---|
| Control Pellets | NA | 16,294,162 | NA |
| Acetylated α Cyclodextrin Pellets | 0.75% | 2,365,120 | 85% |
| Acetylated α Cyclodextrin Pellets (Duplicate) | 0.75% | 4,109,950 | 75% |
| Acetylated β Cyclodextrin Pellets | 0.75% | 8,977,360 | 45% |
| Acetylated α and Acetylated β Cyclodextrin Pellets | 0.375% ea. | 2,938,261 | 82% |
| Acetylated α and Acetylated β Cyclodextrin Pellets (Duplicate) | 0.375% ea. | 3,896,854 | 76% |

The above explanation of the nature of the cyclodextrin derivatives, the thermoplastic materials, coatings and containers, manufacturing details regarding the containers, provides a basis for understanding the technology involving incorporating the cyclodextrin material in PET containers for barrier and trapping purposes. However, since many embodiments of the invention can be made without the party from the spirit and scope of the invention, the invention resides in the claims hereinafter appended.

What is claimed is:

1. A thermoplastic pellet comprising a major proportion of a thermoplastic polymer and, uniformly dispersed in the polymer, an effective barrier, and extractable beverage compound absorbing amount of a modified cyclodextrin material, substantially free of an inclusion complex compound, having pendent moieties or substituents that render the cyclodextrin material compatible with the thermoplastic polymer.

2. The pellet of claim 1 comprising a polyester condensation/polymerization reaction product of a diol and an aromatic diacid compound.

3. The pellet of claim 2 wherein the aromatic diacid compound comprises terephthalic acid, dimethyl terephthalate, 2,6-naphthalene dicarboxylic acid, dimethyl-2,6-naphthalene dicarboxylate.

4. The pellet of claim 2 wherein the diol comprises ethylene glycol or 1,4-butane diol.

5. The pellet of claim 1 wherein the cyclodextrin material is present in an amount of about 0.1 to 10 wt % based on the bulk material.

6. The pellet of claim 2 wherein the polyester comprises poly(ethylene-co-terephthalate) or poly(ethylene-co-2,6-naphthalene dicarboxylate).

7. The pellet of claim 1 wherein the polymer is polyethylene or poly(acrylonitrile).

8. The pellet of claim 1 wherein the modified cyclodextrin material comprises an acyl cyclodextrin.

9. The pellet of claim 1 wherein the modified cyclodextrin material comprises a silicone modified cyclodextrin.

* * * * *